United States Patent
Chen et al.

(10) Patent No.: US 12,107,496 B2
(45) Date of Patent: Oct. 1, 2024

(54) CONVERTER CIRCUIT AND RELATED ELECTRONIC DEVICE

(71) Applicant: Huawei Digital Power Technologies Co., Ltd., Shenzhen (CN)

(72) Inventors: Haitao Chen, Shenzhen (CN); Xingzhong Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 245 days.

(21) Appl. No.: 17/848,155

(22) Filed: Jun. 23, 2022

(65) Prior Publication Data

US 2022/0321005 A1 Oct. 6, 2022

Related U.S. Application Data

(63) Continuation of application No. PCT/CN2019/127761, filed on Dec. 24, 2019.

(51) Int. Cl.
*H02M 3/155* (2006.01)
*H02J 7/00* (2006.01)
(Continued)

(52) U.S. Cl.
CPC .......... *H02M 3/155* (2013.01); *H02J 7/0016* (2013.01); *H02M 3/01* (2021.05); *H02M 3/07* (2013.01)

(58) Field of Classification Search
CPC .......... H02M 3/155; H02M 3/01; H02M 3/07; H02J 7/0016
See application file for complete search history.

(56) References Cited

U.S. PATENT DOCUMENTS

| 2017/0110893 A1 | 4/2017 | Cao |
| 2019/0341855 A1 | 11/2019 | Kim et al. |

(Continued)

FOREIGN PATENT DOCUMENTS

| CN | 101018017 A | 8/2007 |
| CN | 102651563 B | 6/2014 |

(Continued)

OTHER PUBLICATIONS

Li et al.,"A High Efficiency Resonant Switched-Capacitor Converter for Data Center," IEEE, Total 7 Pages, Institute of Electrical and Electronics Engineers, New York, New York (2017).

(Continued)

*Primary Examiner* — Adolf D Berhane
(74) *Attorney, Agent, or Firm* — Leydig, Voit & Mayer, Ltd.

(57) ABSTRACT

A converter circuit includes a capacitor module and a balance module. The capacitor module includes at least a first capacitor and a second capacitor. The balance module includes at least a first resonant circuit. The first resonant circuit includes at least two switch groups connected in parallel and a first resonant cavity bridged between the two switch groups. The first capacitor and the second capacitor are connected in series. The first resonant circuit is separately bridged between two ends of the first capacitor and between two ends of the second capacitor. The balance module controls each switch in the first resonant circuit, so that each switch works with the first resonant cavity to affect a current, to balance a voltage between the two ends of the first capacitor and a voltage between the two ends of the second capacitor.

19 Claims, 31 Drawing Sheets

(51) Int. Cl.
  *H02M 3/00*  (2006.01)
  *H02M 3/07*  (2006.01)

(56) References Cited

U.S. PATENT DOCUMENTS

2023/0155488 A1\*  5/2023  Chen .................... H02M 3/155
                                                363/21.02
2023/0208287 A1\*  6/2023  Chen ..................... H02M 3/07
                                                  363/13

FOREIGN PATENT DOCUMENTS

| | | |
|---|---|---|
| CN | 105207476 A | 12/2015 |
| CN | 106026665 A | 10/2016 |
| CN | 107482943 A | 12/2017 |
| KR | 20060055415 A | 5/2006 |
| WO | 2019145016 A1 | 8/2019 |
| WO | WO-2023230920 A1 \* | 12/2023 |

OTHER PUBLICATIONS

Webb et al.,"12 Switch Zero-Inductor Voltage Converter Topology," IEEE, Total 8 pages, Institute of Electrical and Electronics Engineers, New York, New York (2019).

\* cited by examiner

CONVERTER CIRCUIT AND RELATED ELECTRONIC DEVICE

CROSS-REFERENCE TO RELATED APPLICATIONS

This application is a continuation of International Application No. PCT/CN2019/127761, filed on Dec. 24, 2019, which is hereby incorporated by reference in its entirety.

TECHNICAL FIELD

Embodiments of this application relate to the field of circuits, and in particular, to a converter circuit and a related electronic device.

BACKGROUND

With development of artificial intelligence (AI) technologies, computing power and capacities of chips supporting AI are continuously increasing, which results in an increase in power consumption. Therefore, a power supply solution for the chips is particularly important.

In the conventional technology, in a resonant switch capacitor solution in the power supply solution of the chips, a converter circuit in which capacitors are connected in series is usually used. The converter circuit has a large voltage imbalance risk after running for a long time.

SUMMARY

Embodiments of this application provide a converter circuit and a related electronic device to balance a voltage between two ends of each capacitor and to implement different voltage transformation ratios by adjusting a quantity of capacitor modules.

According to a first aspect, an embodiment of this application provides a converter circuit that includes: a capacitor module and a balance module. The capacitor module includes at least a first capacitor and a second capacitor. The balance module includes at least a first resonant circuit. The first resonant circuit includes at least two switch groups connected in parallel and a first resonant tank bridged between the two switch groups. The first capacitor and the second capacitor are connected in series. The first resonant circuit is separately bridged between two ends of the first capacitor and between two ends of the second capacitor. The balance module controls each switch in the first resonant circuit, so that each switch works with the first resonant tank to affect a current, to balance a voltage between two ends of the first capacitor and a voltage between two ends of the second capacitor.

In this embodiment of this application, the balance module controls each switch in the first resonant circuit, so that each switch works with the first resonant tank to affect a current, to balance the voltage between the two ends of the first capacitor and the voltage between the two ends of the second capacitor. Then, different voltage transformation ratios are obtained based on a quantity of capacitors in the capacitor module and a voltage division rule.

Based on the first aspect, this embodiment of this application further provides a first implementation of the first aspect:

The first resonant circuit includes at least a first switch, a second switch, a third switch, a fourth switch, and the first resonant tank. The first resonant tank includes at least a first resonant capacitor and a first resonant inductor. The first switch and the third switch are connected in series. The second switch and the fourth switch are connected in series. One end of the second capacitor is connected to a first end of the first switch, and the other end of the second capacitor is separately connected to a first end of the second switch, a second end of the third switch, and one end of the first capacitor. The other end of the first capacitor is connected to a second end of the fourth switch. One end of the first resonant tank is separately connected to a second end of the first switch and a first end of the third switch, and the other end of the first resonant tank is separately connected to a second end of the second switch and a first end of the fourth switch. The first switch and the third switch are not simultaneously turned on. The second switch and the fourth switch are not simultaneously turned on.

In this embodiment of this application, a turn-on state of each switch in the first resonant circuit is controlled to transfer energy between the first capacitor and the second capacitor through the first resonant circuit. Therefore, a voltage between two ends of each capacitor is balanced. Then, a two-fold voltage transformation ratio is obtained based on two capacitors in the capacitor module and the voltage division rule.

Based on the first implementation of the first aspect, this embodiment of this application further provides a second implementation of the first aspect:

The capacitor module further includes a third capacitor. The balance module further includes a second resonant circuit. The second resonant circuit includes at least two switch groups connected in parallel and a second resonant tank bridged between the two switch groups. One of the two switch groups in the second resonant circuit includes at least a fifth switch and a seventh switch, and the other of the two switch groups in the second resonant circuit includes at least a sixth switch and an eighth switch. The second resonant tank includes at least a second resonant capacitor and a second resonant inductor. The second resonant circuit is separately bridged between the two ends of the first capacitor and between two ends of the third capacitor. The balance module controls each switch in the second resonant circuit, so that each switch works with the second resonant tank to affect a current, to balance a voltage between the two ends of the first capacitor and a voltage between the two ends of the third capacitor. The fifth switch and the seventh switch are not simultaneously turned on. The sixth switch and the eighth switch are not simultaneously turned on.

This embodiment of this application provides a converter circuit that may implement a three-fold voltage transformation ratio.

Based on the first implementation of the first aspect, this embodiment of this application further provides a third implementation of the first aspect:

The balance module further includes a second resonant circuit. The second resonant circuit includes at least two switch groups connected in parallel and a second resonant tank bridged between the two switch groups. One of the two switch groups in the second resonant circuit includes at least a fifth switch and a seventh switch, and the other of the two switch groups in the second resonant circuit includes at least a sixth switch and an eighth switch. The second resonant tank includes at least a second resonant capacitor and a second resonant inductor. The balance module controls each switch in the second resonant circuit, so that each switch works with the second resonant tank to affect a current, to balance a voltage between the two ends of the first capacitor and a voltage between two ends of the second resonant capacitor. The fifth switch and the seventh switch are not simultaneously turned on. The sixth switch and the eighth switch are not simultaneously turned on.

This embodiment of this application provides another converter circuit that may implement a three-fold voltage transformation ratio.

Based on the second implementation of the first aspect, this embodiment of this application further provides a fourth implementation of the first aspect:

The first resonant capacitor and the first resonant inductor are connected in series. The second resonant capacitor and the second resonant inductor are connected in series. The first capacitor, the second capacitor, and the third capacitor are sequentially connected in series. One end of the third capacitor is connected to a first end of the fifth switch, and the other end of the third capacitor is separately connected to a first end of the sixth switch, the first end of the first switch, and one end of the second capacitor. The other end of the second capacitor is separately connected to the first end of the second switch, one end of the first capacitor, the second end of the third switch, and a second end of the seventh switch. The other end of the first capacitor is separately connected to the second end of the fourth switch and a second end of the eighth switch. The first switch and the third switch are connected in series. The second switch and the fourth switch are connected in series. One end of the first resonant tank is separately connected to the second end of the first switch and the first end of the third switch, and the other end of the first resonant tank is separately connected to the second end of the second switch and the first end of the fourth switch. The fifth switch and the seventh switch are connected in series. The sixth switch and the eighth switch are connected in series. One end of the second resonant tank is separately connected to a second end of the fifth switch and a first end of the seventh switch, and the other end of the second resonant tank is separately connected to a second end of the sixth switch and a first end of the eighth switch.

In this embodiment of this application, the first capacitor, the second capacitor, and the third capacitor are sequentially connected in series. A turn-on state of each switch in the first resonant circuit and the second resonant circuit is controlled to transfer energy between the first capacitor and the second capacitor through the first resonant circuit, and between the first capacitor and the third capacitor through the second resonant circuit. Therefore, a voltage between two ends of each capacitor is balanced. Each resonant circuit converts only part of power, and efficiency of power conversion is high. Then, a three-fold voltage transformation ratio is obtained based on three capacitors in the capacitor module and the voltage division rule, that is, a voltage gain is 3:1 or 1:3.

Based on the third implementation of the first aspect, this embodiment of this application further provides a fifth implementation of the first aspect:

The capacitor module further includes a third capacitor. The first resonant capacitor and the first resonant inductor are connected in series. The second resonant capacitor and the second resonant inductor are connected in series. A first end of the fifth switch is connected to one end of the third capacitor. The sixth switch is separately connected to one end of the second capacitor and the first end of the first switch. The other end of the second capacitor is separately connected to the first end of the second switch, one end of the first capacitor, the second end of the third switch, and a second end of the sixth switch. The other end of the first capacitor is separately connected to the other end of the third capacitor, the second end of the fourth switch, and a second end of the eighth switch. The first switch and the third switch are connected in series. The second switch and the fourth switch are connected in series. One end of the first resonant tank is separately connected to the second end of the first switch and the first end of the third switch, and the other end of the first resonant tank is separately connected to the second end of the second switch and the first end of the fourth switch. The fifth switch and the seventh switch are connected in series. The sixth switch and the eighth switch are connected in series. One end of the second resonant tank is separately connected to a second end of the fifth switch and a first end of the seventh switch, and the other end of the second resonant tank is separately connected to the second end of the sixth switch and a first end of the eighth switch.

In this embodiment of this application, the first capacitor, the second capacitor, and the second resonant capacitor are sequentially connected in series. A turn-on state of each switch in the first resonant circuit and the second resonant circuit is controlled to transfer energy between the first capacitor and the second capacitor through the first resonant circuit, and between the first capacitor and the second resonant capacitor through the second resonant circuit. Therefore, a voltage between two ends of each capacitor is balanced. Each resonant circuit converts only part of the power, and efficiency of power conversion is high. Then, a three-fold voltage transformation ratio is obtained based on two capacitors and one second resonant capacitor in the capacitor module and the voltage division rule, that is, a voltage gain is 3:1 or 1:3.

Based on the third implementation of the first aspect, this embodiment of this application further provides a sixth implementation of the first aspect:

The converter circuit further includes a direct current power supply. A first resonant capacitor and a first resonant inductor are connected in series. The second resonant capacitor and the second resonant inductor are connected in series. A first end of the fifth switch is connected to one end of the direct current power supply. The sixth switch is separately connected to one end of the second capacitor and the first end of the first switch. The other end of the second capacitor is separately connected to the first end of the second switch, one end of the first capacitor, the second end of the third switch, and a second end of the sixth switch. The other end of the first capacitor is separately connected to the other end of the direct current power supply, the second end of the fourth switch, and a second end of the eighth switch. The first switch and the third switch are connected in series. The second switch and the fourth switch are connected in series. One end of the first resonant tank is separately connected to the second end of the first switch and the first end of the third switch, and the other end of the first resonant tank is separately connected to the second end of the second switch and the first end of the fourth switch. The fifth switch and the seventh switch are connected in series. The sixth switch and the eighth switch are connected in series. One end of the second resonant tank is separately connected to a second end of the fifth switch and a first end of the seventh switch, and the other end of the second resonant tank is separately connected to the second end of the sixth switch and a first end of the eighth switch.

In this embodiment of this application, the first capacitor, the second capacitor, and the second resonant capacitor are sequentially connected in series. A turn-on state of each switch in the first resonant circuit and the second resonant circuit is controlled to transfer energy between the first capacitor and the second capacitor through the first resonant circuit, and between the first capacitor and the second resonant capacitor through the second resonant circuit. Therefore, a voltage between two ends of each capacitor is balanced. Each resonant circuit converts only part of the power, and efficiency of power conversion is high. Then, a three-fold voltage transformation ratio is obtained based on two capacitors and one second resonant capacitor in the capacitor module and the voltage division rule, that is, a voltage gain is 3:1 or 1:3.

Based on the fourth implementation of the first aspect, this embodiment of this application further provides a seventh implementation of the first aspect:

The capacitor module further includes a fourth capacitor. The balance module further includes a third resonant circuit. The third resonant circuit includes at least two switch groups connected in parallel and a third resonant tank bridged between the two switch groups. One of the two switch groups in the third resonant circuit includes at least a ninth switch and an eleventh switch, and the other one of the two switch groups in the third resonant circuit includes at least a tenth switch and a twelfth switch. The third resonant circuit includes at least a third resonant capacitor and a third resonant inductor. The third resonant circuit is separately bridged between the two ends of the first capacitor and between two ends of the fourth capacitor. The balance module controls each switch in the third resonant circuit, so that each switch works with the third resonant tank to affect a current, to balance a voltage between the two ends of the first capacitor and a voltage between the two ends of the fourth capacitor. The ninth switch and the eleventh switch are not simultaneously turned on. The tenth switch and the twelfth switch are not simultaneously turned on.

This embodiment of this application provides a converter circuit that may implement a four-fold voltage transformation ratio.

Based on the fourth implementation of the first aspect, this embodiment of this application further provides an eighth implementation of the first aspect:

The balance module further includes a third resonant circuit. The third resonant circuit includes at least two switch groups connected in parallel and a third resonant tank bridged between the two switch groups. One of the two switch groups in the third resonant circuit includes at least a ninth switch and an eleventh switch, and the other one of the two switch groups in the third resonant circuit includes at least a tenth switch and a twelfth switch. The third resonant circuit includes at least a third resonant capacitor and a third resonant inductor. The balance module controls each switch in the third resonant circuit, so that each switch works with the third resonant tank to affect a current, to balance a voltage between the two ends of the first capacitor and a voltage between two ends of the third resonant capacitor. The ninth switch and the eleventh switch are not simultaneously turned on. The tenth switch and the twelfth switch are not simultaneously turned on.

This embodiment of this application provides another converter circuit that may implement a four-fold voltage transformation ratio.

Based on the seventh implementation of the first aspect, this embodiment of this application further provides a ninth implementation of the first aspect:

The third resonant capacitor and the third resonant inductor are connected in series. The first capacitor, the second capacitor, the third capacitor, and the fourth capacitor are sequentially connected in series. One end of the fourth capacitor is connected to a first end of the ninth switch, and the other end of the fourth capacitor is separately connected to a first end of the tenth switch, the first end of the fifth switch, and one end of the third capacitor. One end of the third capacitor is connected to the first end of the fifth switch, and the other end of the third capacitor is separately connected to the first end of the sixth switch, the first end of the first switch, and one end of the second capacitor. The other end of the second capacitor is separately connected to the first end of the second switch, one end of the first capacitor, the second end of the third switch, the second end of the seventh switch, and a second end of the eleventh switch. The other end of the first capacitor is separately connected to the second end of the fourth switch, the second end of the eighth switch, and a second end of the twelfth switch. The ninth switch and the eleventh switch are connected in series. The tenth switch and the twelfth switch are connected in series. One end of the third resonant tank is separately connected to a second end of the ninth switch and a first end of the eleventh switch, and the other end of the third resonant tank is separately connected to a second end of the tenth switch and a first end of the twelfth switch.

In this embodiment of this application, the first capacitor, the second capacitor, the third capacitor, and the fourth capacitor are sequentially connected in series. A turn-on state of each switch in the first resonant circuit and the second resonant circuit is controlled to transfer energy between the first capacitor and the second capacitor through the first resonant circuit, between the first capacitor and the third capacitor through the second resonant circuit, and between the first capacitor and the fourth capacitor through the third resonant circuit. Therefore, a voltage between two ends of each capacitor is balanced. Each resonant circuit converts only part of the power, and efficiency of power conversion is high. Then, a four-fold voltage transformation ratio is obtained based on four capacitors in the capacitor module and the voltage division rule, that is, a voltage gain is 4:1 or 4:3.

Based on the eighth implementation of the first aspect, this embodiment of this application further provides a tenth implementation of the first aspect:

The capacitor module further includes a fourth capacitor. The third resonant capacitor and the third resonant inductor are connected in series. A first end of the ninth switch is connected to one end of the fourth capacitor. The tenth switch is separately connected to the first end of the fifth switch and one end of the third capacitor. The other end of the third capacitor is separately connected to the first end of the sixth switch, the first end of the first switch, and one end of the second capacitor. The other end of the second capacitor is separately connected to the first end of the second switch, one end of the first capacitor, the second end of the third switch, and the second end of the sixth switch. The other end of the first capacitor is separately connected to the other end of the fourth capacitor, the second end of the fourth switch, and the second end of the eighth switch. The ninth switch and the eleventh switch are connected in series. The tenth switch and the twelfth switch are connected in series. One end of the third resonant tank is separately connected to a second end of the ninth switch and a first end of the eleventh switch, and the other end of the third resonant tank is separately connected to a second end of the tenth switch and a first end of the twelfth switch.

In this embodiment of this application, the first capacitor, the second capacitor, the third capacitor, and the third resonant capacitor are sequentially connected in series. A turn-on state of each switch in the first resonant circuit, the second resonant circuit, and the third resonant circuit is controlled to transfer energy between the first capacitor and the second capacitor through the first resonant circuit, between the first capacitor and the third capacitor through the second resonant circuit, and between the first capacitor and the third resonant capacitor through the third resonant circuit. Therefore, a voltage between two ends of each capacitor is balanced. Each resonant circuit converts only part of the power, and efficiency of power conversion is high. Then, a four-fold voltage transformation ratio is obtained based on three capacitors and one third resonant capacitor in the capacitor module and the voltage division rule, that is, a voltage gain is 4:1 or 1:4.

Based on the eighth implementation of the first aspect, this embodiment of this application further provides an eleventh implementation of the first aspect:

The converter circuit further includes a direct current power supply. The third resonant capacitor and the third resonant inductor are connected in series. A first end of the ninth switch is connected to one end of the direct current power supply. The tenth switch is separately connected to the first end of the fifth switch and one end of the third capacitor. The other end of the third capacitor is separately connected to the first end of the sixth switch, the first end of the first switch, and one end of the second capacitor. The other end of the second capacitor is separately connected to the first end of the second switch, one end of the first capacitor, the second end of the third switch, and the second end of the sixth switch. The other end of the first capacitor is separately connected to the other end of the direct current power supply, the second end of the fourth switch, and the second end of the eighth switch. The ninth switch and the eleventh switch are connected in series. The tenth switch and the twelfth switch are connected in series. One end of the third resonant tank is separately connected to a second end of the ninth switch and a first end of the eleventh switch, and the other end of the third resonant tank is separately connected to a second end of the tenth switch and a first end of the twelfth switch.

In this embodiment of this application, the first capacitor, the second capacitor, the third capacitor, and the third resonant capacitor are sequentially connected in series. A turn-on state of each switch in the first resonant circuit, the second resonant circuit, and the third resonant circuit is controlled to transfer energy between the first capacitor and the second capacitor through the first resonant circuit, between the first capacitor and the third capacitor through the second resonant circuit, and between the first capacitor and the third resonant capacitor through the third resonant circuit. Therefore, a voltage between two ends of each capacitor is balanced. Each resonant circuit converts only part of the power, and efficiency of power conversion is high. Then, a four-fold voltage transformation ratio is obtained based on three capacitors and one third resonant capacitor in the capacitor module and the voltage division rule, that is, a voltage gain is 4:1 or 1:4.

Based on the first aspect and the first to eleventh implementations of the first aspect, this embodiment of this application further provides a twelfth implementation of the first aspect: A voltage between the two ends of the first capacitor is an output voltage, and a voltage between the two ends of the capacitor module is an input voltage.

In this embodiment of this application, the voltage between the two ends of the first capacitor is an output voltage, and the voltage between the two ends of the capacitor module is an input voltage, so that the converter circuit may implement voltage reduction.

Based on the first aspect and the first to eleventh implementations of the first aspect, this embodiment of this application further provides a thirteenth implementation of the first aspect: A voltage between the two ends of the first capacitor is an input voltage, and a voltage between the two ends of the capacitor module is an output voltage.

In this embodiment of this application, the input voltage and the input voltage are exchanged, so that the converter circuit may implement boosting.

Based on the first aspect and the first to eleventh implementations of the first aspect, this embodiment of this application further provides a fourteenth implementation of the first aspect: The switch is an insulated gate bipolar transistor (IGBT).

This embodiment of this application provides a feasible solution of the converter circuit.

Based on the first aspect and the first to eleventh implementations of the first aspect, this embodiment of this application further provides a fifteenth implementation of the first aspect: The switch is an N-channel metal oxide semiconductor (NMOS).

This embodiment of this application provides a feasible solution of the converter circuit.

Based on the first aspect and the first to eleventh implementations of the first aspect, this embodiment of this application further provides a sixteenth implementation of the first aspect: The first switch and the third switch are N-channel metal oxide semiconductors (NMOSs), and the second switch and the fourth switch are diodes.

This embodiment of this application provides a feasible solution of the converter circuit.

Based on the first aspect and the second to eleventh implementations of the first aspect, this embodiment of this application further provides a seventeenth implementation of the first aspect: The first switch, the third switch, the fifth switch, and the seventh switch are the N-channel metal oxide semiconductors (NMOSs), and the second switch, the fourth switch, the sixth switch, and the eighth switch are diodes.

This embodiment of this application provides a feasible solution of the converter circuit.

According to a second aspect, an embodiment of this application provides an electric device that includes the converter circuit described in the first aspect.

DESCRIPTION OF EMBODIMENTS

Figure 1:
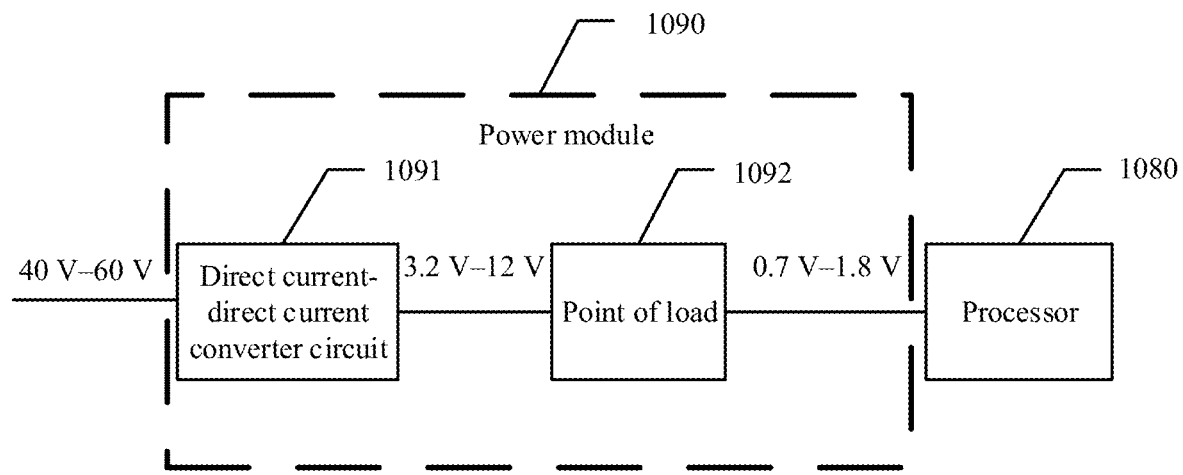
FIG. 1 is a schematic diagram of an architecture of a power module according to an embodiment of this application.

Embodiments of this application provide a converter circuit to balance a voltage between two ends of each capacitor and implement different voltage transformation ratios. It should be understood that the converter circuit in embodiments of this application may be used in any direct current conversion scenario, and specifically, may be used in a power module. FIG. 1 is a schematic diagram of an architecture of an electronic device according to an embodiment of this application. As shown in FIG. 1, a power module 1090 includes a direct current-direct current converter circuit 1091, a point of load (POL) 1092, and the like.

The direct current-direct current converter circuit 1091 is used to convert an input voltage 40 V-60 V into 3.2 V-12 V and transmit the converted voltage to the POL through a bus.

The POL 1092 is configured to convert 3.2 V-12 V into 0.7 V-1.8 V and supply power to a processor 1080.

The converter circuit in embodiments of this application includes a buck converter circuit and a boost converter circuit, which are separately described below:

I. Buck Converter Circuit (a Voltage Between Two Ends of a First Capacitor is an Output Voltage, and a Voltage Between Two Ends of a Capacitor Module is an Input Voltage)

Figure 2A:
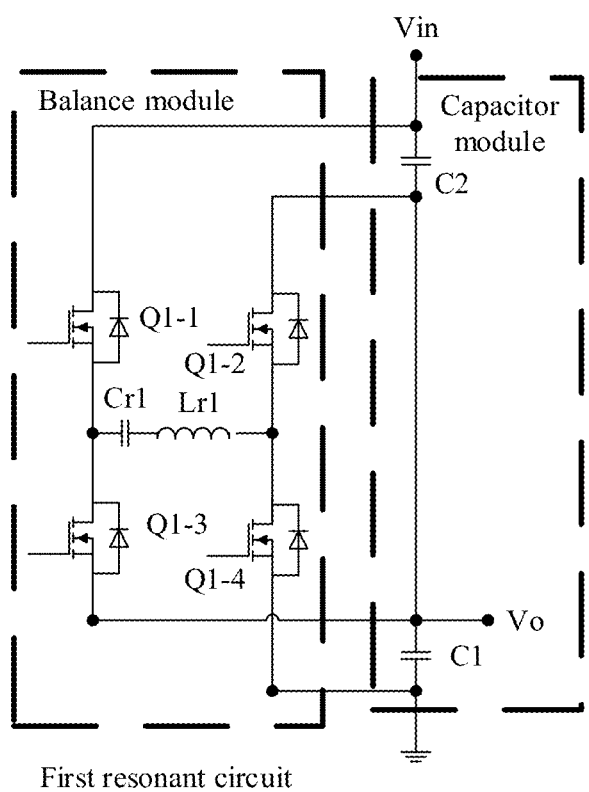
FIG. 2A is a schematic diagram of a first embodiment of a converter circuit according to an embodiment of this application.

With reference to FIG. 2A, an embodiment of this application provides a converter circuit, including a capacitor module and a balance module.

The capacitor module includes a first capacitor and a second capacitor. The balance module includes a first resonant circuit. The first resonant circuit includes at least two switch groups connected in parallel and a first resonant tank bridged between the two switch groups. One of the two switch groups in the first resonant circuit includes at least a first switch and a third switch, and the other of the two switch groups in the first resonant circuit includes at least a second switch and a fourth switch. The first resonant tank includes at least a first resonant capacitor and a first resonant inductor. The first capacitor and the second capacitor are connected in series. The first switch and the third switch are connected in series. The second switch and the fourth switch are connected in series. One end of the second capacitor is connected to a first end of the first switch, and the other end of the second capacitor is separately connected to a first end of the second switch, a second end of the third switch, and one end of the first capacitor. The other end of the first capacitor is connected to a second end of the fourth switch. One end of the first resonant tank is separately connected to a second end of the first switch and a first end of the third switch, and the other end of the first resonant tank is separately connected to a second end of the second switch and a first end of the fourth switch. The balance module controls each switch to be turned on or off, to balance a voltage between two ends of the first capacitor and a voltage between two ends of the second capacitor.

In this embodiment of this application, the first resonant tank may be formed by connecting the first resonant capacitor Cr1 and the first resonant inductor Lr1 in series, by connecting the first resonant capacitor Cr1 and the first resonant inductor Lr1 in series and then connecting two ends of the first resonant inductor Lr1 to another capacitor, or by another equivalent method. This is not specifically limited herein.

In this embodiment of this application, a complete period of a switch includes a first period and a second period, and the first period and the second period each account for half the complete period of the switch. In actual application, the complete period may include the first period, a dead time, and the second period. This is not specifically limited herein.

Figure 2B:
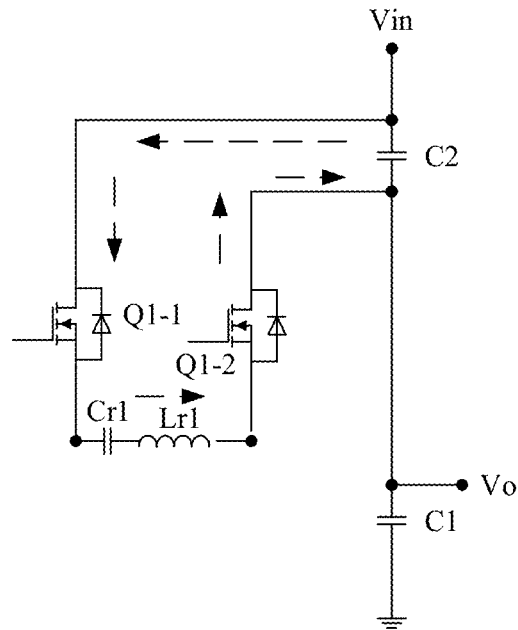
FIG. 2B is an equivalent diagram in a first period in a first embodiment of a converter circuit according to an embodiment of this application.

An operating principle of the converter circuit shown in FIG. 2A is described in detail as follows:

First Period:

FIG. 2A may be equivalent to FIG. 2B. When the first switch Q1-1 and the second switch Q1-2 are turned on (a high level is input) and the third switch Q1-3 and the fourth switch Q1-4 are turned off (a low level is input), energy is transferred between the second capacitor C2 and the first resonant capacitor Cr1.

Figure 2C:
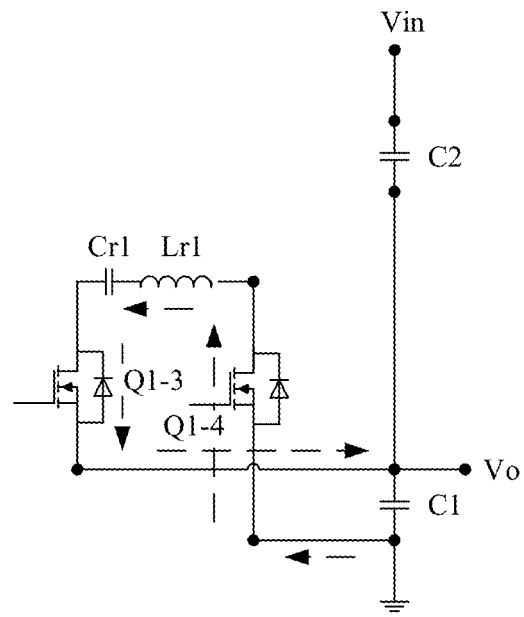
FIG. 2C is an equivalent diagram in a second period in a first embodiment of a converter circuit according to an embodiment of this application.

Second Period:

FIG. 2A may be equivalent to FIG. 2C. When the third switch Q1-3 and the fourth switch Q1-4 are turned on (a high level is input) and the first switch Q1-1 and the second switch Q1-2 are turned off (a low level is input), the first capacitor C1 is charged by the first resonant capacitor Cr1. In this case, the first capacitor C1 is an output capacitor. Because a duty cycle of a drive signal is close to 50%, a voltage between two ends of the first capacitor C1 is equal to a voltage between two ends of the first resonant capacitor Cr1. Further, because the first capacitor C1 and the second capacitor C2 are connected in series and a total voltage is Vin, it can be concluded, based on a voltage division rule, that the voltage (an output voltage Vo) between the two ends of the first capacitor C1 is half the input voltage Vin, that is, a ratio of the input voltage Vin to the output voltage Vo is 2:1.

Figure 2D:
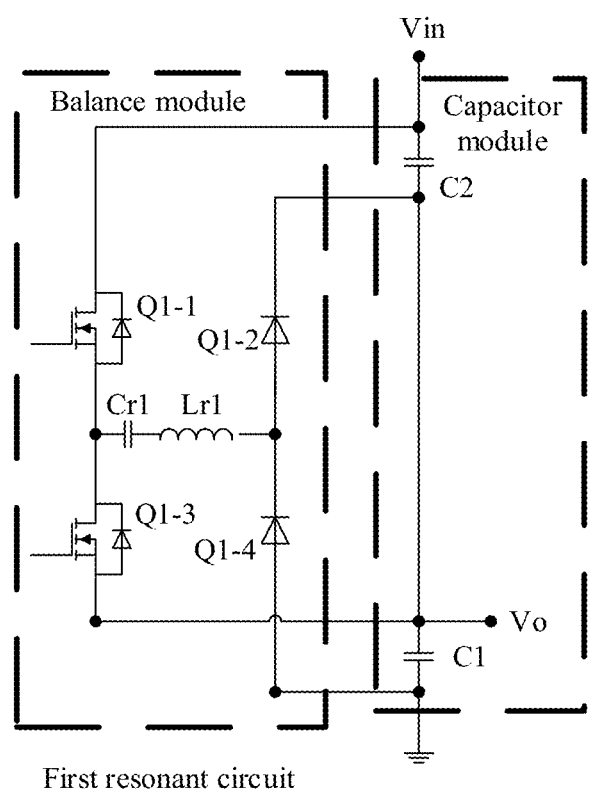
FIG. 2D is an equivalent diagram of a resonant circuit of a converter circuit according to an embodiment of this application.

In this embodiment of this application, that a switch is an N-channel metal oxide semiconductor (NMOS) is only described as an example. It can be understood that the switch may alternatively be a controllable device, for example, an insulated gate bipolar transistor (IGBT), a gallium nitride (GaN) power switch, or a silicon carbide (Sic) switch. As shown in FIG. 2D, the second switch Q1-2 and the fourth switch Q1-4 may be replaced with diodes. This is not specifically limited herein.

In this embodiment of this application, the balance module controls each switch in the first resonant circuit, so that each switch works with the first resonant tank to affect a current, to balance the voltage between the two ends of the first capacitor and the voltage between the two ends of the second capacitor. In this case, different voltage transformation ratios are obtained based on a quantity of capacitors in the capacitor module and the voltage division rule.

For ease of understanding, different voltage transformation ratios are separately described below:

1. The Ratio of the Input Voltage to the Output Voltage is N:1.

In this embodiment of this application, the capacitor module of the converter circuit has a plurality of forms which are separately described below:

1.1. The First Capacitor C1, the Second Capacitor C2, . . . , and an $N^{th}$ Capacitor Cn are Sequentially Connected in Series.

Figure 2E:
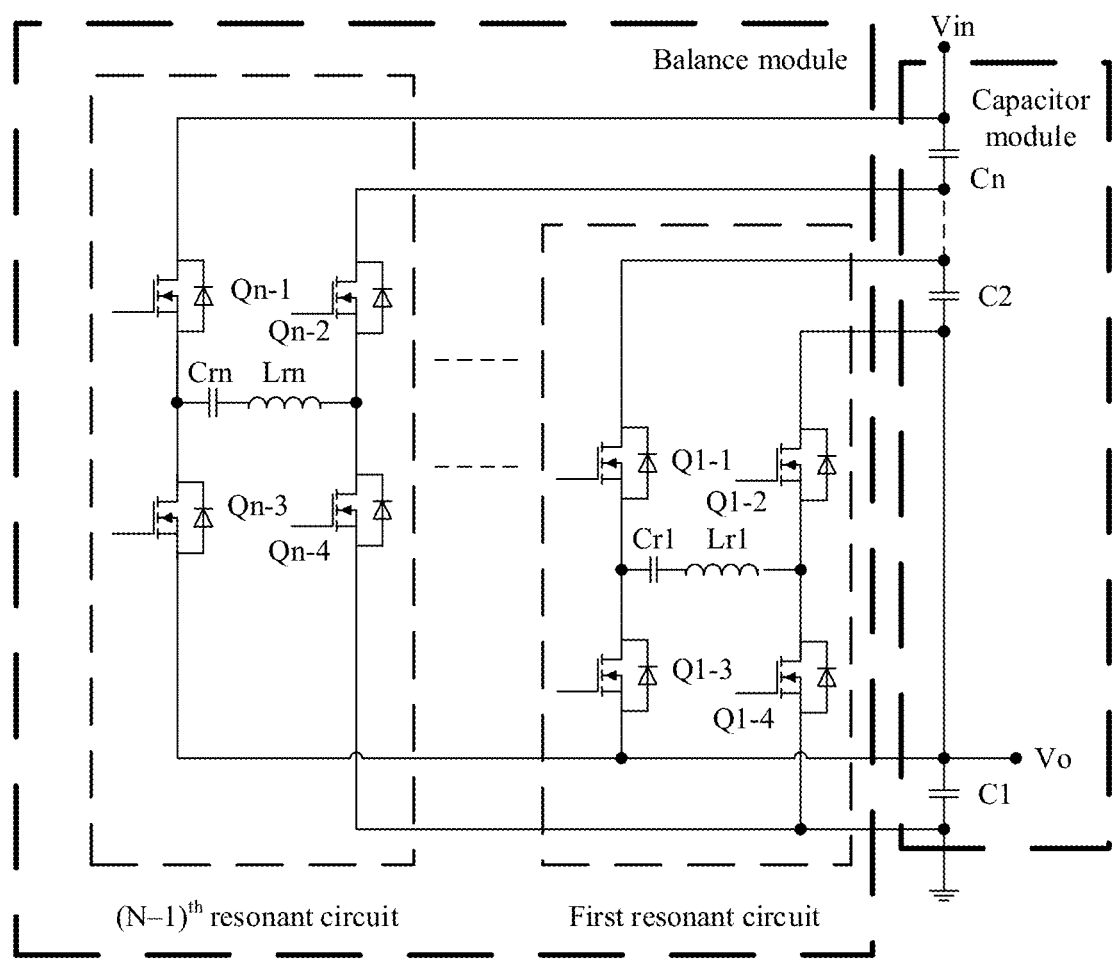
FIG. 2E is a schematic diagram of a second embodiment of a converter circuit according to an embodiment of this application.

FIG. 2E is a schematic diagram of a second embodiment of the converter circuit provided in the embodiments of this application. This embodiment of this application provides the second embodiment of the converter circuit. The converter circuit includes a capacitor module and a balance module.

The balance module includes a first resonant circuit and an $(N-1)^{th}$ resonant circuit. The capacitor module includes a first capacitor C1, an $(N-1)^{th}$ capacitor Cn-1, and an $N^{th}$ capacitor Cn. That n may be equal to N is only used as an example. It can be understood that n may be N-1, or may not be related to N. This is not limited herein. N is an integer greater than or equal to 3. The first resonant circuit includes at least four switches and a first resonant tank. The four switches are a first switch Q1-1, a second switch Q1-2, a third switch Q1-3, and a fourth switch Q1-4. The first resonant tank includes a first resonant capacitor Cr1 and a first resonant inductor Lr1. The $(N-1)^{th}$ resonant circuit includes at least four switches and an $(N-1)^{th}$ resonant tank. The four switches are a fifth switch Qn-1, a sixth switch Qn-2, a seventh switch Qn-3, and an eighth switch Qn-4. The $(N-1)^{th}$ resonant tank includes an $(N-1)^{th}$ resonant capacitor Crn and an $(N-1)^{th}$ resonant inductor Lrn.

In this embodiment of this application, the first resonant tank may be formed by connecting the first resonant capacitor Cr1 and the first resonant inductor Lr1 in series, by connecting the first resonant capacitor Cr1 and the first resonant inductor Lr1 in series and then connecting two ends of the first resonant inductor Lr1 to another capacitor, or by another equivalent method. This is not specifically limited herein. The $(N-1)^{th}$ resonant tank may be formed by connecting the $(N-1)^{th}$ resonant capacitor Crn and the $(N-1)^{th}$ resonant inductor Lrn in series, by connecting the $(N-1)^{th}$ resonant capacitor Crn and the $(N-1)^{th}$ resonant inductor Lrn in series and then connecting two ends of the $(N-1)^{th}$ resonant inductor Lrn to another capacitor, or by another equivalent method. This is not specifically limited herein.

The first capacitor C1, the second capacitor C2, and the $N^{th}$ capacitor Cn are sequentially connected in series. The first switch Q1-1 and the third switch Q1-3 are connected in series. The second switch Q1-2 and the fourth switch Q1-4 are connected in series. The fifth switch Qn-1 and the seventh switch Qn-3 are connected in series. The sixth switch Qn-2 and the eighth switch Qn-4 are connected in series. A first end of the fifth switch Qn-1 is connected to one end of the $N^{th}$ capacitor Cn, and a first end of the sixth switch Qn-2 is connected to the other end of the $N^{th}$ capacitor Cn. A second end of the seventh switch Qn-3 is connected to one end of the first capacitor C1 and a second end of the eighth switch Qn-4 is connected to the other end of the first capacitor C1. A first end of the first switch Q1-1 is connected to one end of the second capacitor C2, and a first end of the second switch Q1-2 is connected to the other end of the second capacitor C2. A second end of the third switch Q1-3 is connected to one end of the first capacitor C1, and a second end of the fourth switch Q1-4 is connected to the other end of the first capacitor C1. One end of the first resonant tank is separately connected to a second end of the first switch Q1-1 and a first end of the third switch Q1-3, and the other end of the first resonant tank is separately connected to a second end of the second switch Q1-2 and the second end of the fourth switch Q1-4. One end of the $(N-1)^{th}$ resonant tank is connected to a second end of the fifth switch Qn-1 and a first end of the seventh switch Qn-3, and the other end of the $(N-1)^{th}$ resonant tank is separately connected to a second end of the sixth switch Qn-2 and the second end of the eighth switch Qn-4.

In this embodiment of this application, a first end of a switch is a drain of an NMOS, a second end of the switch is a source of the NMOS, and a third end of the switch is a gate of the NMOS. The gate is used for receiving a drive signal, and the drive signal may be a pulse width modulation (PWM) signal. This is not specifically limited herein.

Similar to that shown in FIG. 2D, the sixth switch Q2-2 and the eighth switch Q2-4 in this embodiment of this application may be replaced with diodes.

In this embodiment of this application, a duty cycle of a drive signal of each switch is close to 50%, that is, a turn-on time of each switch is approximately half of one period, and an operating frequency of each switch is at or near a resonant frequency of a resonant tank. It can be understood that, in actual application, a dead time is needed for an actual circuit, and in this case, the duty cycle may be approximately 50%.

For ease of understanding, refer to Table 1:

TABLE 1

| Switch | Q1-1 | Q1-2 | Q1-3 | Q1-4 | Qn-1 | Qn-2 | Qn-3 | Qn-4 |
|---|---|---|---|---|---|---|---|---|
| State 1 | 1 | 1 | 0 | 0 | 1 | 1 | 0 | 0 |
| State 2 | 1 | 1 | 0 | 0 | 0 | 0 | 1 | 1 |
| State 3 | 0 | 0 | 1 | 1 | 0 | 0 | 1 | 1 |
| State 4 | 0 | 0 | 1 | 1 | 1 | 1 | 0 | 0 |

1 indicates turn-on, and 0 indicates turn-off. State 1 and State 3 indicate in-phase driving in each resonant circuit (synchronous turn-on and turn-off). State 2 and State 4 indicate out-of-phase driving in each resonant circuit (asynchronous turn-on and turn-off).

It can be understood that Table 1 is only an example for describing a turn-on state and a turn-off state of each switch. In actual application, when the first switch Q1-1 is turned on, the fifth switch Qn-1 is turned on. The four states described in Table 1 are not all states. Except that the first switch Q1-1 and the third switch Q1-3 cannot be simultaneously turned on, the second switch Q1-2 and the fourth switch Q1-4 cannot be simultaneously turned on, the fifth switch Qn-1 and the seventh switch Qn-3 cannot be simultaneously turned on, and the sixth switch Qn-2 and the eighth switch Qn-4 cannot be simultaneously turned on, all other states can be used. Table 1 is only used as an example, and does not constitute a limitation.

In this embodiment of this application, when an input voltage Vin is a voltage between two ends of the capacitor module and an output voltage Vo is a voltage between two ends of the first capacitor C1, a turn-on state of each switch is controlled to separately transfer energy between the first capacitor C1 and the second capacitor and between the first capacitor C1 and the N capacitor Cn through a corresponding resonant circuit. Therefore, a voltage between two ends of each capacitor is balanced. Each resonant circuit converts only part of power, and efficiency of power conversion is high. Then, a voltage gain N:1 is obtained based on a voltage division rule in which N capacitors in the capacitor module are connected in series.

1.2. The First Capacitor C1 and the Second Capacitor C2 are Connected in Series, and then the Two Capacitors and the $N^{th}$ Capacitor Cn are Connected in Parallel.

Figure 3:
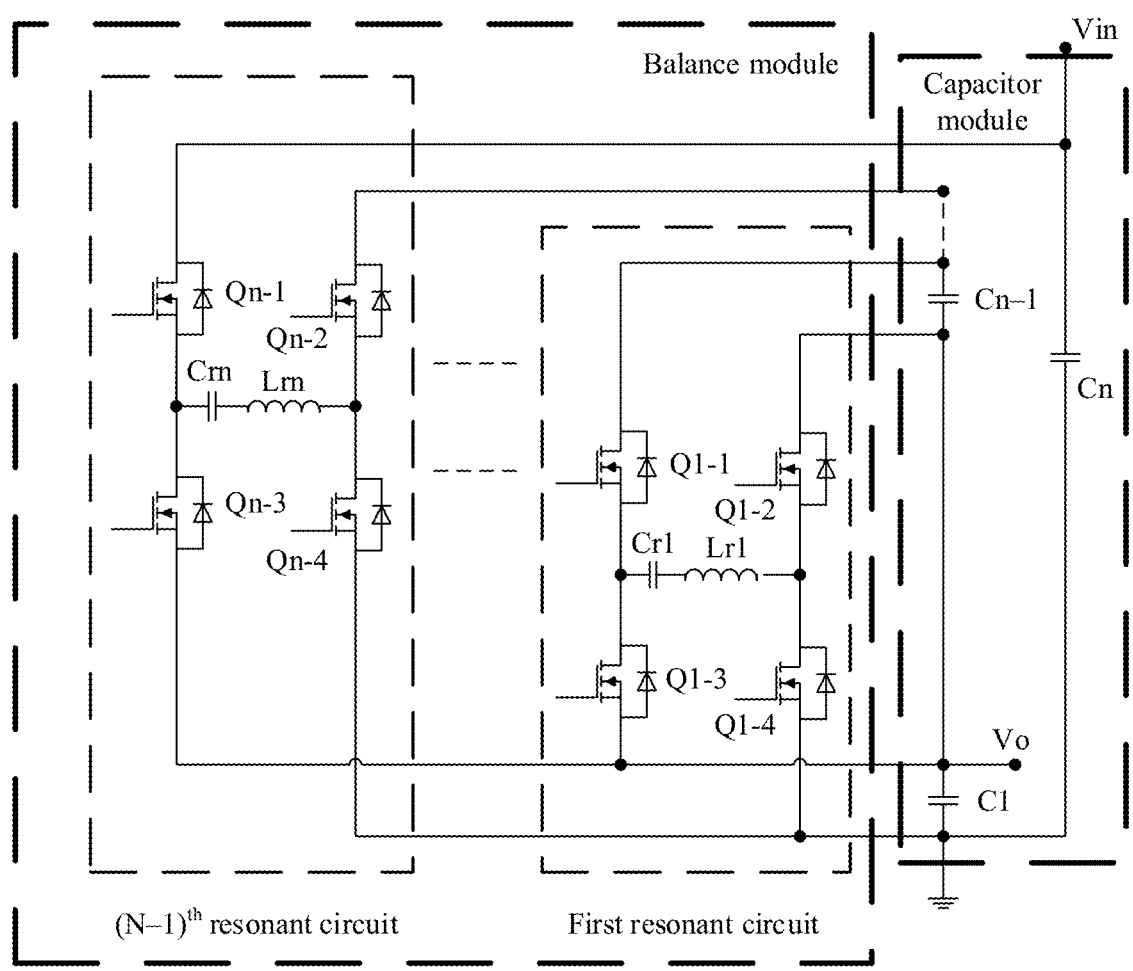
FIG. 3 is a schematic diagram of a third embodiment of a converter circuit according to an embodiment of this application.

FIG. 3 is a schematic diagram of a third embodiment of the converter circuit provided in the embodiments of this application. This embodiment of this application provides the third embodiment of the converter circuit. Components in this embodiment are similar to those in FIG. 2E. Details are not described herein again. A difference between the two embodiments lies in a connection mode of the $N^{th}$ capacitor Cn. The following describes a specific structure of the converter circuit.

The first capacitor C1 and the $(N-1)^{th}$ capacitor Cn-1 are sequentially connected in series. The first switch Q1-1 and the third switch Q1-3 are connected in series. The second switch Q1-2 and the fourth switch Q1-4 are connected in series. The fifth switch Qn-1 and the seventh switch Qn-3 are connected in series. The sixth switch Qn-2 and the eighth switch Qn-4 are connected in series. The first end of the fifth switch Qn-1 is connected to one end of the $N^{th}$ capacitor Cn. The first end of the sixth switch Qn-2 is connected to one end of the $(N-1)^{th}$ capacitor Cn-1. The second end of the seventh switch Qn-3 is connected to one end of the first capacitor C1, and the second end of the eighth switch Qn-4 is connected to the other end of the first capacitor C1. The first end of the first switch Q1-1 is connected to one end of the $(N-1)^{th}$ capacitor Cn-1, and the first end of the second switch Q1-2 is connected to the other end of the $(N-1)^{th}$ capacitor Cn-1. The second end of the third switch Q1-3 is connected to one end of the first capacitor C1, and the second end of the fourth switch Q1-4 is connected to the other end of the first capacitor C1. One end of the first resonant tank is separately connected to the second end of the first switch Q1-1 and the first end of the third switch Q1-3, and the other end of the first resonant tank is separately connected to the second end of the second switch Q1-2 and the second end of the fourth switch Q1-4. One end of the $(N-1)^{th}$ resonant tank is separately connected to the second end of the fifth switch Qn-1 and the first end of the seventh switch Qn-3, and the other end of the $(N-1)^{th}$ resonant tank is separately connected to the second end of the sixth switch Qn-2 and the second end of the eighth switch Qn-4. One end of the $N^{th}$ capacitor Cn is connected to the first end of the first switch Q1-1, and the other end of the $N^{th}$ capacitor Cn is separately connected to the other end of the first capacitor C1, the second end of the fourth switch Q1-4, and the second end of the eighth switch Qn-4.

In this embodiment of this application, when an input voltage Vin is a voltage between two ends of the capacitor module and an output voltage Vo is a voltage between two ends of the first capacitor C1, the converter circuit is a buck circuit. A turn-on state of each switch is controlled to separately transfer energy between the first capacitor C1 and the $(N-1)^{th}$ capacitor Cn-1 and between the first capacitor C1 and the $N^{th}$ resonant capacitor Crn through a corresponding resonant circuit. Therefore, a voltage between two ends of each capacitor is balanced. Each resonant circuit converts only part of power, and efficiency of power conversion is high. Then, a voltage gain N:1 is obtained based on a voltage division rule in which N−1 capacitors in the capacitor module and the $N^{th}$ resonant capacitor Crn are connected in series.

1.3. The First Capacitor C1 and the (N−1)$^{th}$ Capacitor Cn−1 are Connected in Series, and the Two Capacitors and a Direct Current Power Supply V_dc are Connected in Parallel.

Figure 4:
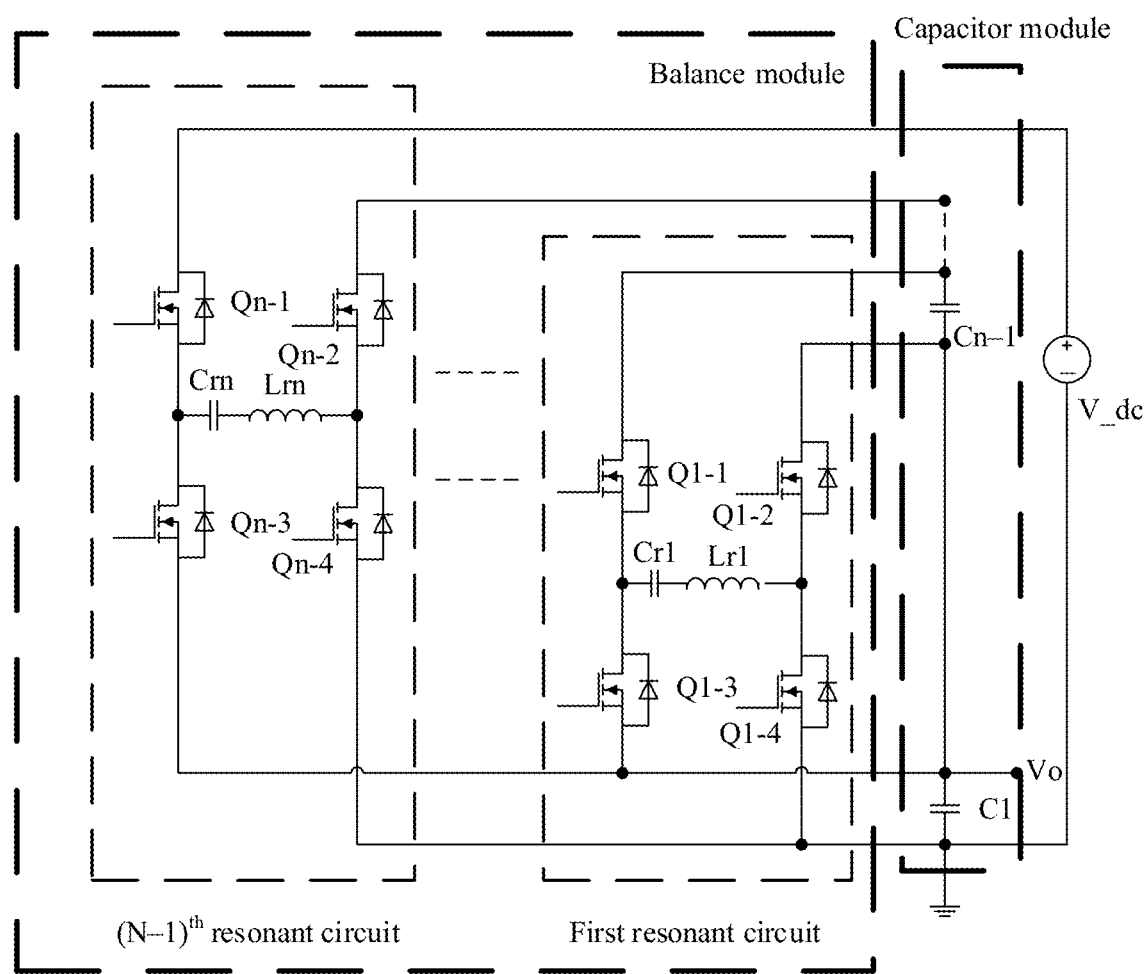
FIG. 4 is a schematic diagram of a fourth embodiment of a converter circuit according to an embodiment of this application.

FIG. 4 is a schematic diagram of a fourth embodiment of the converter circuit provided in the embodiments of this application. This embodiment of this application provides the fourth embodiment of the converter circuit. Components in this embodiment are similar to those in FIG. 3. Details are not described herein again. A difference lies in that the N$^{th}$ capacitor Cn is replaced with the direct current power supply V_dc (as shown in FIG. 4).

In this embodiment of this application, when an input voltage Vin is a voltage between two ends of the capacitor module and an output voltage Vo is a voltage between two ends of the first capacitor C1, the converter circuit is a buck circuit. A turn-on state of each switch is controlled to separately transfer energy between the first capacitor C1 and the (N−1)$^{th}$ capacitor Cn−1 and between the first capacitor C1 and the N$^{th}$ resonant capacitor Crn through a corresponding resonant circuit. Therefore, a voltage between two ends of each capacitor is balanced. Then, a voltage gain N:1 is obtained based on a voltage division rule in which N−1 capacitors in the capacitor module and the N$^{th}$ resonant capacitor Crn are connected in series.

For ease of understanding, the following uses N=3 as an example for detailed descriptions.

2. The Ratio of the Input Voltage to the Output Voltage is 3:1.

In the embodiments of this application, the capacitor module of the converter circuit has a plurality of forms which are separately described below:

2.1. The First Capacitor C1, the Second Capacitor C2, and a Third Capacitor C3 are Sequentially Connected in Series.

Figure 5:
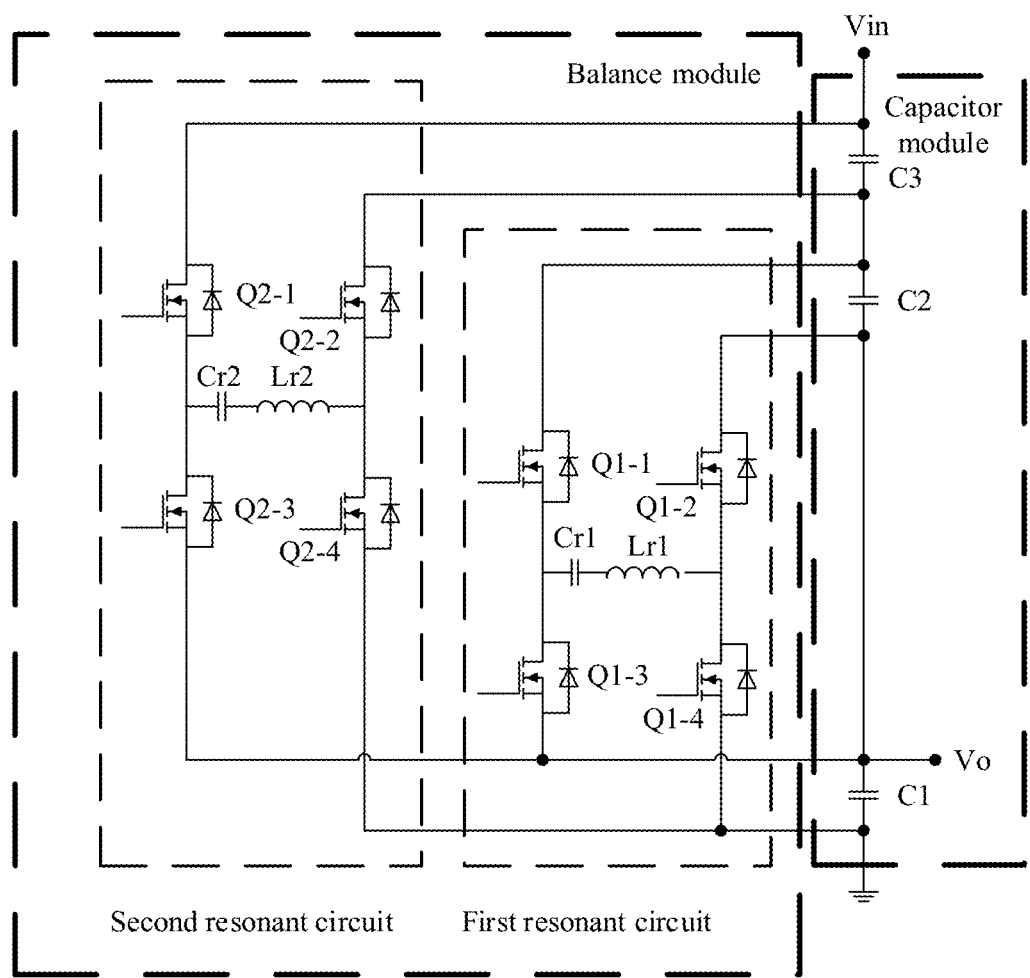
FIG. 5 is a schematic diagram of a fifth embodiment of a converter circuit according to an embodiment of this application.

FIG. 5 is a schematic diagram of a fifth embodiment of the converter circuit provided in the embodiments of this application. This embodiment of this application provides the fifth embodiment of the converter circuit. The converter circuit includes a capacitor module and a balance module. The balance module includes a first resonant circuit and a second resonant circuit. The capacitor module includes a first capacitor C1, a second capacitor C2, and a third capacitor C3.

The first resonant circuit is separately bridged between two ends of the first capacitor and between two ends of the second capacitor. The second resonant circuit is separately bridged between the two ends of the first capacitor and between two ends of the third capacitor.

The first resonant circuit includes at least four switches and a first resonant tank. The four switches are a first switch Q1-1, a second switch Q1-2, a third switch Q1-3, and a fourth switch Q1-4. The first resonant tank includes a first resonant capacitor Cr1 and a first resonant inductor Lr1. The second resonant circuit includes at least four switches and a second resonant tank. The four switches are a fifth switch Q2-1, a sixth switch Q2-2, a seventh switch Q2-3, and an eighth switch Q2-4. The second resonant tank includes a second resonant capacitor Cr2 and a second resonant inductor Lr2.

The first capacitor C1, the second capacitor C2, and the third capacitor C3 are sequentially connected in series. The first switch Q1-1 and the third switch Q1-3 are connected in series. The second switch Q1-2 and the fourth switch Q1-4 are connected in series. The fifth switch Q2-1 and the seventh switch Q2-3 are connected in series. The sixth switch Q2-2 and the eighth switch Q2-4 are connected in series. One end of the third capacitor C3 is connected to a first end of the fifth switch Q2-1, and the other end of the third capacitor C3 is separately connected to a first end of the sixth switch Q2-2, a first end of the first switch Q1-1, and a first end of the second capacitor C2. The other end of the second capacitor C2 is separately connected to a first end of the second switch Q1-2, one end of the first capacitor C1, a second end of the third switch Q1-3, and a second end of the seventh switch Q2-3. The other end of the first capacitor C1 is separately connected to a second end of the fourth switch Q1-4 and a second end of the eighth switch Q2-4. One end of the first resonant tank is separately connected to a second end of the first switch Q1-1 and a first end of the third switch Q1-3, and the other end of the first resonant tank is separately connected to a second end of the second switch Q1-2 and a first end of the fourth switch Q1-4. One end of the second resonant tank is separately connected to a second end of the fifth switch Q2-1 and a first end of the seventh switch Q2-3, and the other end of the second resonant tank is separately connected to a second end of the sixth switch Q2-2 and a first end of the eighth switch Q2-4.

In this embodiment of this application, that the first resonant capacitor Cr1 and the first resonant inductor Lr1 are connected in series is only used as an example to describe the first resonant tank. It can be understood that, in actual application, the first resonant tank may be formed by connecting the first resonant capacitor Cr1 and the first resonant inductor Lr1 in series and then connecting the two ends of the first resonant inductor Lr1 to another capacitor, or by other equivalent forms. This is not specifically limited herein. The second resonant tank is formed by a method similar to that of the first resonant tank, or by another equivalent method. This is not specifically limited herein.

In this embodiment of this application, a duty cycle of a drive signal of each switch is close to 50%, that is, a turn-on time of each switch is approximately half of one period, and each switch operates at or near a resonant frequency of the resonant tank.

Figure 6:
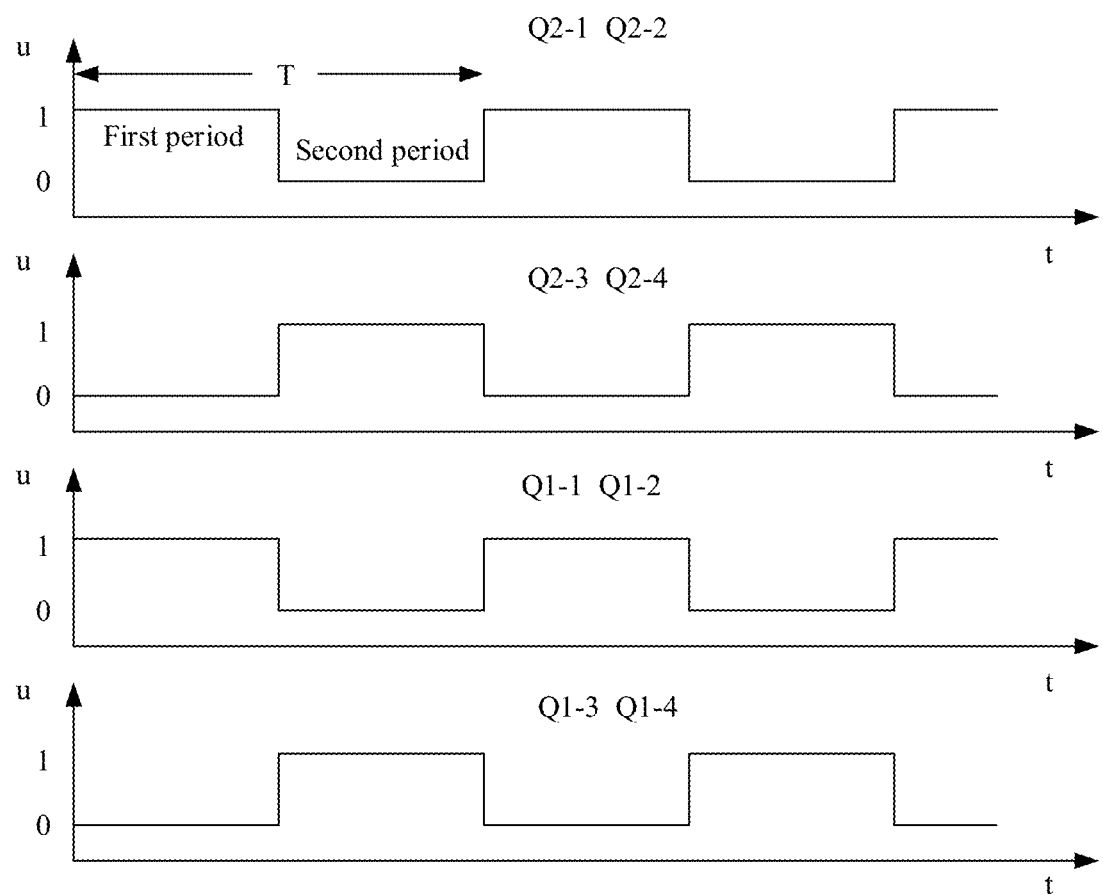
FIG. 6 is a schematic diagram of in-phase switches according to an embodiment of this application.
Figure 7:
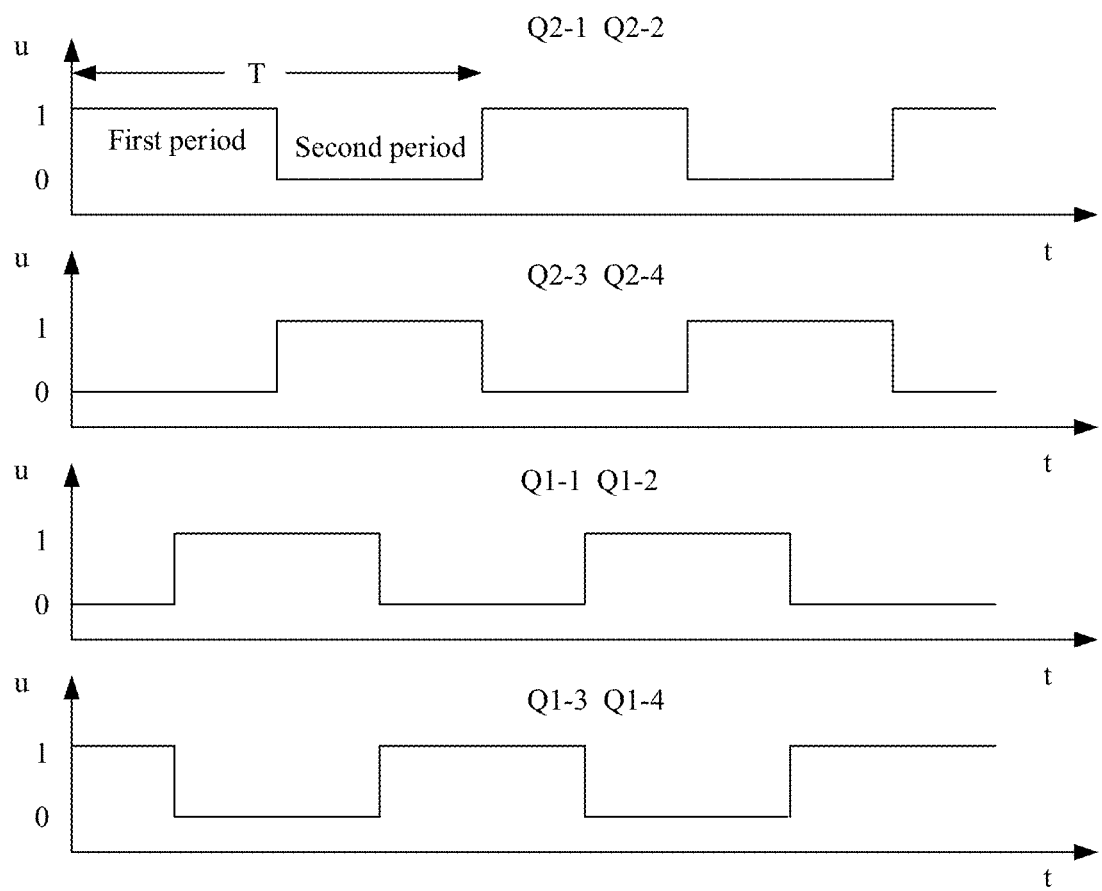
FIG. 7 is a schematic diagram of out-of-phase switches according to an embodiment of this application.

Table 1 shows some turn-on and turn-off states of each switch. For ease of understanding, FIG. 6 is a schematic diagram of in-phase driving of each switch in the first resonant circuit and the second resonant circuit, and FIG. 7 is a schematic diagram of out-of-phase driving of each switch in the first resonant circuit and the second resonant circuit. It can be understood that any phase shift angle may be used. This is not limited herein.

An operating principle of a circuit in this embodiment is as follows:

In this embodiment of this application, a complete period of a switch includes a first period and a second period. As shown in FIG. 6 and FIG. 7, a complete period T includes a first period and a second period, and the first period and the second period account for approximately half the complete period of the switch. In actual application, the complete period may include the first period, a dead time, and the second period. This is not specifically limited herein.

Figure 8:
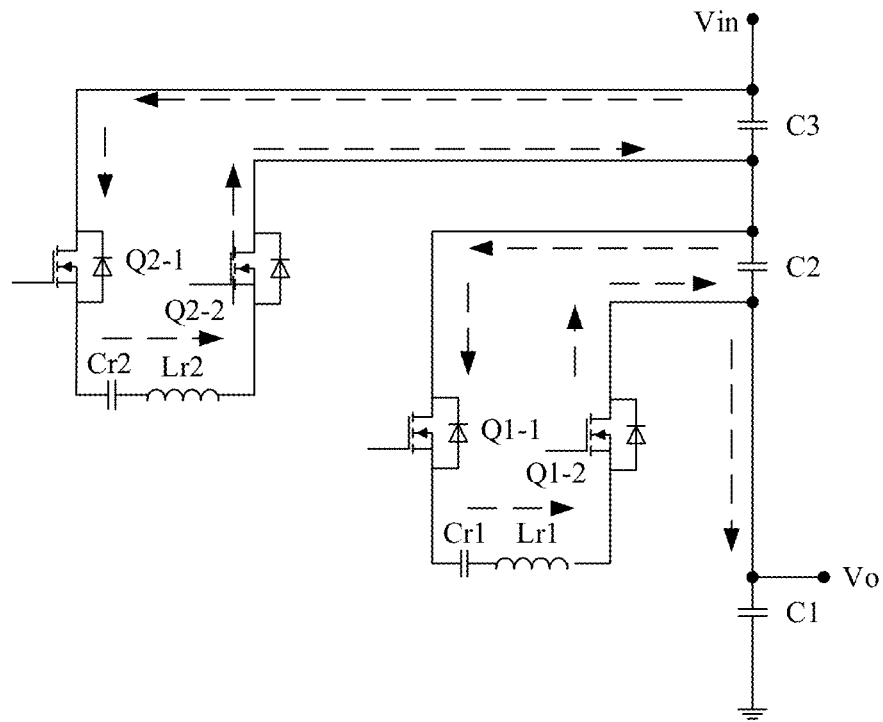
FIG. 8 is an equivalent diagram in a first period in a fifth embodiment of a converter circuit according to an embodiment of this application.

The following uses the in-phase driving shown in FIG. 6 as an example for detailed descriptions of the operating principle in this embodiment:

2.1.1. First Period:

FIG. 5 may be equivalent to FIG. 8. When the first switch Q1-1, the second switch Q1-2, the fifth switch Q2-1, and the sixth switch Q2-2 are turned on (a high level is input) and the third switch Q1-3, the fourth switch Q1-4, the seventh switch Q2-3, and the eighth switch Q2-4 are turned off (a low level is input), energy is transferred between the second capacitor C2 and the first resonant capacitor Cr1 and between the third capacitor C3 and the second resonant capacitor Cr2, and the first capacitor C1 is charged with an input voltage Vin through the first resonant tank and the second resonant tank.

Figure 9:
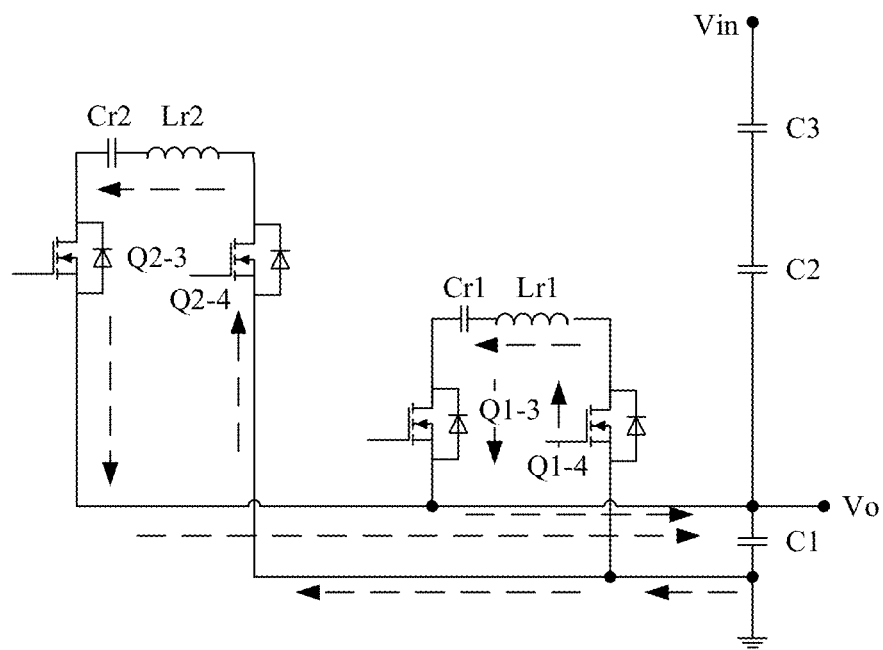
FIG. 9 is an equivalent diagram in a second period in a fifth embodiment of a converter circuit according to an embodiment of this application.

2.1.2. Second Period:

FIG. 5 may be equivalent to FIG. 9. When the third switch Q1-3, the fourth switch Q1-4, the seventh switch Q2-3, and the eighth switch Q2-4 are turned on (a high level is input) and the first switch Q1-1, the second switch Q1-2, the fifth switch Q2-1, and the sixth switch Q2-2 are turned off (a low level is input), the first capacitor C1 is charged by the first resonant capacitor Cr1 and the second resonant capacitor Cr2. In this case, the first capacitor C1 is an output capacitor. Because a duty cycle of a drive signal is close to 50%, a voltage between two ends of the first resonant capacitor Cr1 is equal to a voltage between two ends of the second resonant capacitor Cr2, that is, a voltage between two ends of the first capacitor C1, a voltage between two ends of the second capacitor C2, and a voltage between two ends of the third capacitor C3 are equal. Further, because the first capacitor C1, the second capacitor C2, and the third capacitor C3 are sequentially connected in series and a total voltage is Vin it can be concluded, based on the voltage division rule, that the voltage (an output voltage Vo) between the two ends of the first capacitor C1 is one third of the input voltage Vin, that is, the ratio of the input voltage Vin to the output voltage Vo is 3:1.

In this embodiment of this application, the balance module controls each switch in the first resonant circuit, so that each switch works with the first resonant tank to affect a current, to balance a voltage between two ends of the first capacitor and a voltage between two ends of the second capacitor. The balance module controls each switch in the second resonant circuit, so that each switch works with the second resonant tank to affect a current, to balance a voltage between two ends of the first capacitor and a voltage between two ends of the third capacitor. Then, a voltage gain 3:1 is obtained based on the voltage division rule in which three capacitors in the capacitor module are connected in series.

2.2. The First Capacitor C1 and the Second Capacitor C2 are Connected in Series, and then the Two Capacitors and the Third Capacitor C3 are Connected in Parallel.

Figure 10:
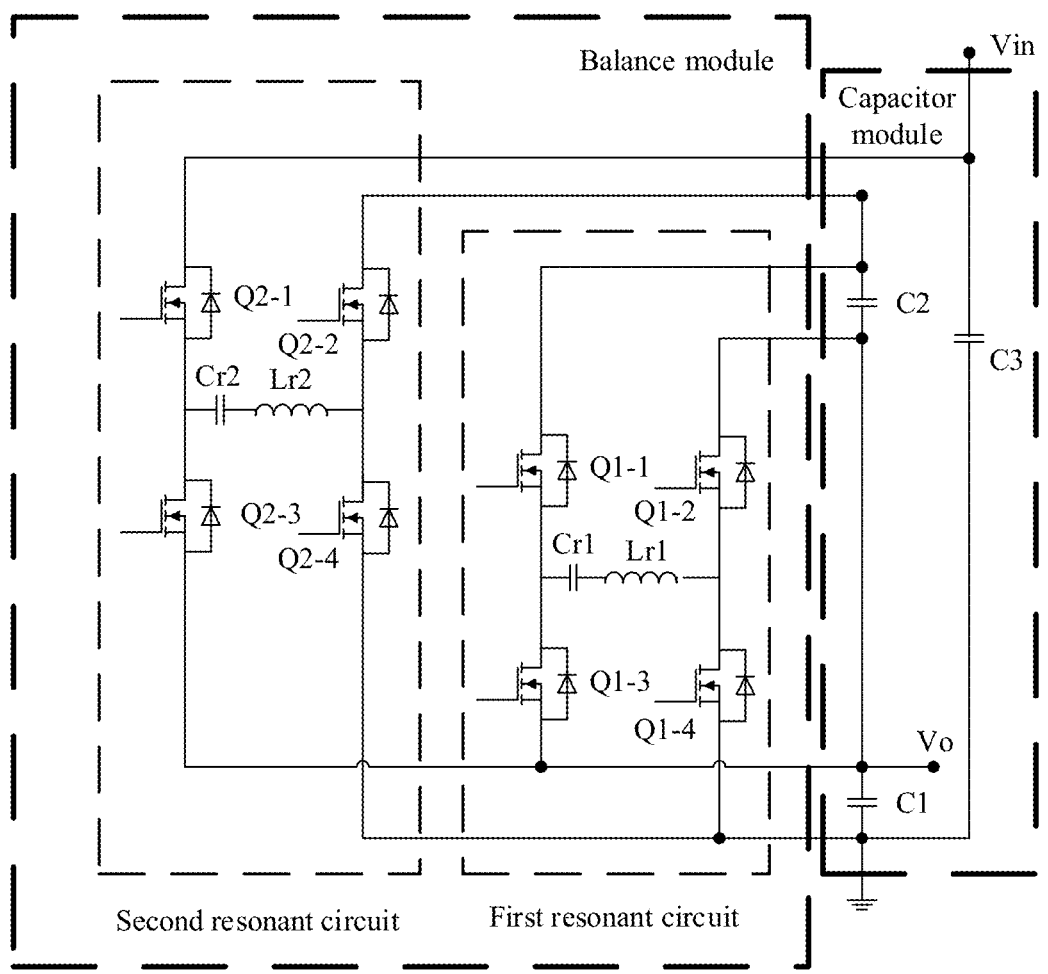
FIG. 10 is a schematic diagram of a sixth embodiment of a converter circuit according to an embodiment of this application.

FIG. 10 is a schematic diagram of a sixth embodiment of the converter circuit provided in the embodiments of this application. This embodiment of this application provides the sixth embodiment of the converter circuit. Components in this embodiment are similar to those in FIG. 5. Details are not described herein again. A difference lies in a connection mode of the third capacitor C3. The following describes a specific structure of the converter circuit.

The first capacitor C1 and the second capacitor C2 are connected in series. The first switch Q1-1 and the third switch Q1-3 are connected in series. The second switch Q1-2 and the fourth switch Q1-4 are connected in series. The fifth switch Q2-1 and the seventh switch Q2-3 are connected in series. The sixth switch Q2-2 and the eighth switch Q2-4 are connected in series. The first end of the fifth switch Q2-1 is connected to one end of the third capacitor C3. The first end of the sixth switch Q2-2 is connected to one end of the second capacitor C2. The second end of the seventh switch Q2-3 is connected to one end of the first capacitor C1, and the second end of the eighth switch Q2-4 is connected to the other end of the first capacitor C1. The first end of the first switch Q1-1 is connected to one end of the second capacitor C2, and the first end of the second switch Q1-2 is connected to the other end of the second capacitor C2. The second end of the third switch Q1-3 is connected to one end of the first capacitor C1, and the second end of the fourth switch Q1-4 is connected to the other end of the first capacitor C1. One end of the first resonant tank is separately connected to the second end of the first switch Q1-1 and the first end of the third switch Q1-3, and the other end of the first resonant tank is separately connected to the second end of the second switch Q1-2 and the second end of the fourth switch Q1-4. One end of the second resonant tank is separately connected to the second end of the fifth switch Q2-1 and the first end of the seventh switch Q2-3, and the other end of the second resonant tank is separately connected to the second end of the sixth switch Q2-2 and the second end of the eighth switch Q2-4. One end of the third capacitor C3 is connected to the first end of the fifth switch Q2-1, and the other end of the third capacitor C3 is separately connected to the other end of the first capacitor C1, the second end of the fourth switch Q1-4, and the second end of the eighth switch Q2-4.

Figure 11:
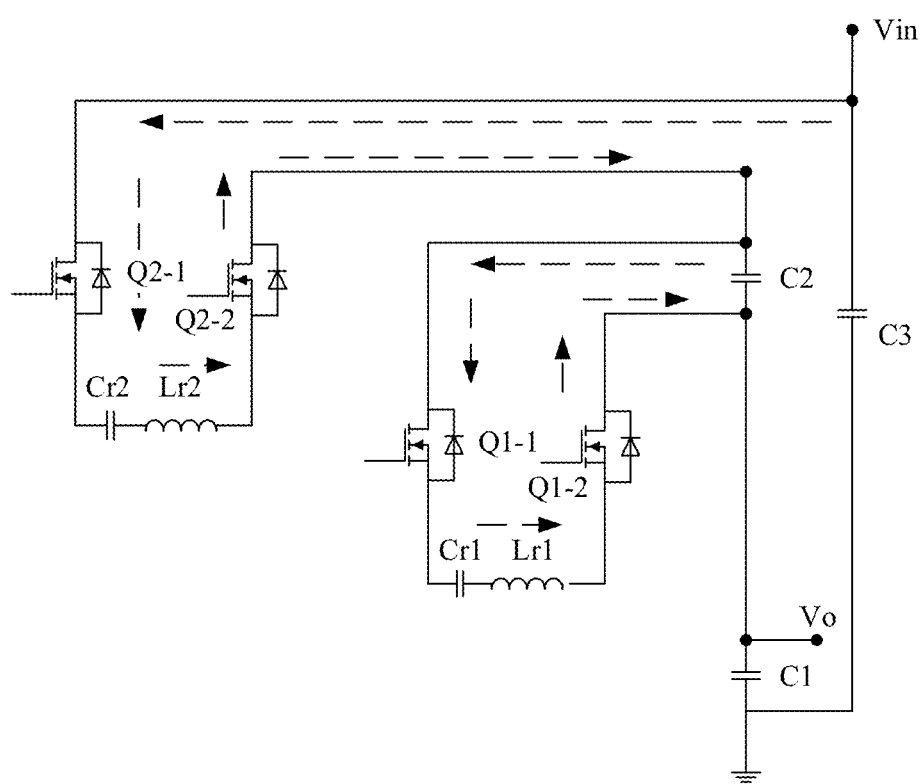
FIG. 11 is an equivalent diagram in a first period in a sixth embodiment of a converter circuit according to an embodiment of this application.

The following uses the in-phase driving shown in FIG. 6 as an example for detailed descriptions of the operating principle in this embodiment:

2.2.1. First Period:

FIG. 10 may be equivalent to FIG. 11. When the first switch Q1-1, the second switch Q1-2, the fifth switch Q2-1, and the sixth switch Q2-2 are turned on (a high level is input) and the third switch Q1-3, the fourth switch Q1-4, the seventh switch Q2-3, and the eighth switch Q2-4 are turned off (a low level is input), energy is transferred between the second capacitor C2 and the first resonant capacitor Cr1, and between Vin and the second resonant capacitor Cr2. The first capacitor C1 is charged with the input voltage Vin through the first resonant tank and the second resonant tank.

Figure 12:
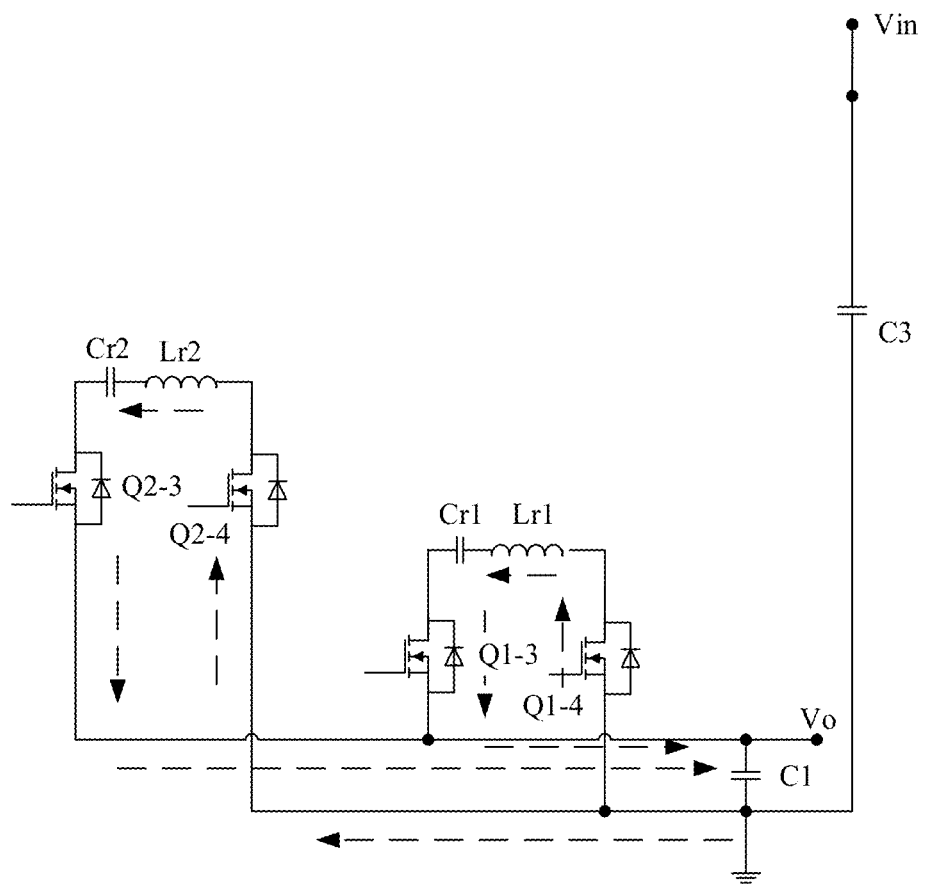
FIG. 12 is an equivalent diagram in a second period in a sixth embodiment of a converter circuit according to an embodiment of this application.

2.2.2. Second Period:

FIG. 10 may be equivalent to FIG. 12. When the third switch Q1-3, the fourth switch Q1-4, the seventh switch Q2-3, and the eighth switch Q2-4 are turned on (a high level is input) and the first switch Q1-1, the second switch Q1-2, the fifth switch Q2-1, and the sixth switch Q2-2 are turned off (a low level is input), the first capacitor C1 is charged by the first resonant capacitor Cr1 and the second resonant capacitor Cr2. In this case, the first capacitor C1 is an output capacitor. Because a duty cycle of a drive signal is close to 50%, a voltage between two ends of the first resonant capacitor Cr1, a voltage between two ends of the second resonant capacitor Cr2, a voltage between two ends of the first capacitor C1, and a voltage between two ends of the second capacitor C2 are equal. Further, because the first capacitor C1, the second capacitor C2, and the second resonant capacitor Cr2 are sequentially connected in series and a total voltage is Vin, it can be concluded, based on the voltage division rule, that the voltage (an output voltage Vo) between the two ends of the first capacitor C1 is one third of the input voltage Vin, that is, a ratio of the input voltage Vin to the output voltage Vo is 3:1.

2.3. The First Capacitor C1 and the Second Capacitor C2 are Connected in Series, and the Two Capacitors and a Direct Current Power Supply V_dc are Connected in Parallel.

Figure 13:
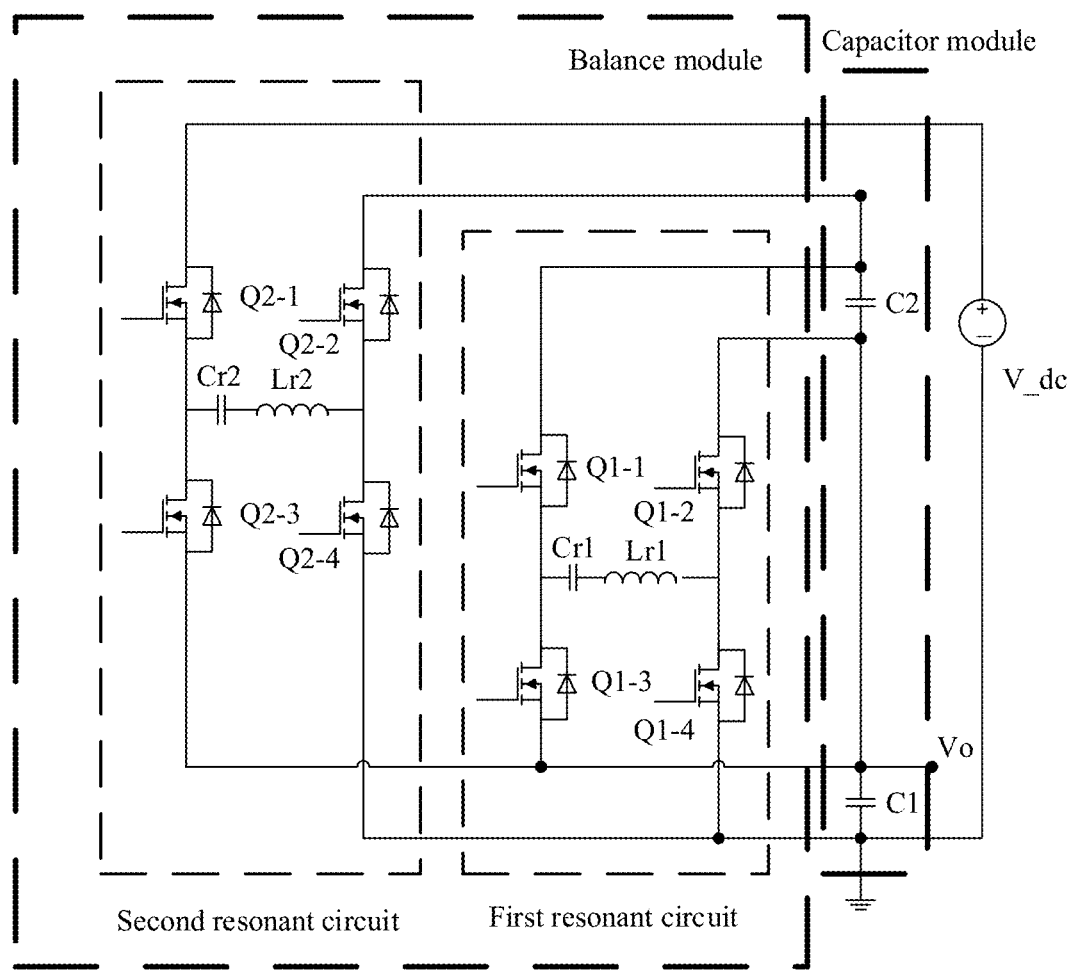
FIG. 13 is a schematic diagram of a seventh embodiment of a converter circuit according to an embodiment of this application.

FIG. 13 is a schematic diagram of a seventh embodiment of the converter circuit provided in the embodiments of this application. This embodiment of this application provides the seventh embodiment of the converter circuit. Components in this embodiment are similar to those in FIG. 10. Details are not described herein again. A difference lies in that the third capacitor C3 is replaced with a direct current power supply V_dc (as shown in FIG. 13).

In this embodiment, after the first switch Q1-1 and the second switch Q1-2 are turned on, energy is transferred between the second capacitor C2 and the first resonance circuit. After the third switch Q1-3 and the fourth switch Q1-4 are turned on, energy is transferred between the first resonance circuit and the first capacitor C1. After the fifth switch Q2-1 and the sixth switch Q2-2 are turned on, energy is transferred between the direct current power supply V_dc and the second resonant circuit. After the seventh switch Q2-3 and the eighth switch Q2-4 are turned on, energy is transferred between the second resonant circuit and the first capacitor C1. Therefore, a voltage gain is 3:1 (for a detailed principle, refer to principles corresponding to FIG. 11 and FIG. 12).

The first resonant circuit in this embodiment of this application may have a plurality of structural forms which are separately described below with reference to a connection between the first resonant circuit and capacitors.

Figure 14:
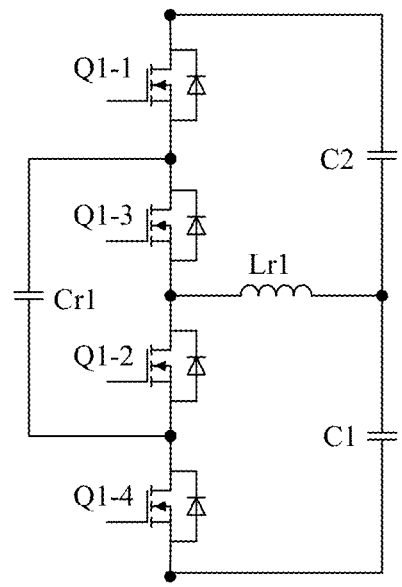
FIG. 14 is an equivalent circuit diagram of a first resonant circuit according to an embodiment of this application.

With reference to FIG. 14, a connection between a structural form of the first resonant circuit and capacitors includes a first capacitor C1, a second capacitor C2, a first switch Q1-1, a second switch Q1-2, a third switch Q1-3, a fourth switch Q1-4, a first resonant capacitor Cr1, and a first resonant inductor Lr1.

The first switch Q1-1, the second switch Q1-2, the third switch Q1-3, and the fourth switch Q1-4 are sequentially connected in series. One end of the first resonant capacitor Cr1 is separately connected to a second end of the first switch Q1-1 and a first end of the third switch Q1-3, and the other end of the first resonant capacitor Cr1 is separately connected to a second end of the second switch Q1-2 and a first end of the fourth switch Q1-4. The first capacitor C1 and the second capacitor C2 are connected in series. One end of the second capacitor C2 is connected to a first end of the first switch Q1-1. One end of the first resonant inductor Lr1 is separately connected to a second end of the third switch Q1-3 and a first end of the second switch Q1-2, and the other end of the first resonant inductor Lr1 is separately connected to the other end of the second capacitor C2 and one end of the first capacitor C1. The other end of the first capacitor C1 is connected to a second end of the fourth switch Q1-4.

An operating principle of the circuit shown in FIG. 14 is similar to descriptions corresponding to FIG. 11 and FIG. 12 in this embodiment. Details are not described herein again.

Figure 15:
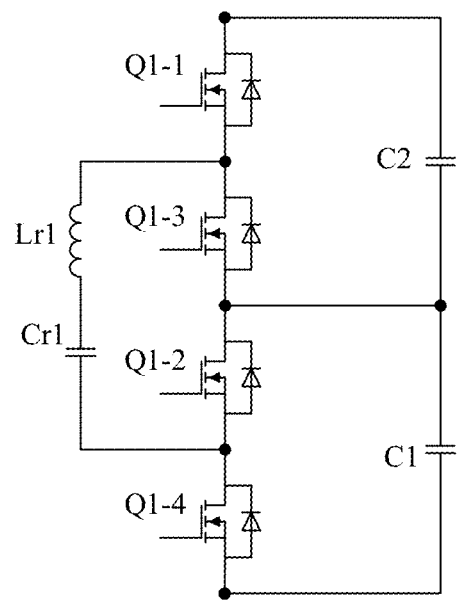
FIG. 15 is another equivalent circuit diagram of a first resonant circuit according to an embodiment of this application.

With reference to FIG. 15, a connection between another structural form of the first resonant circuit and capacitors includes a first capacitor C1, a second capacitor C2, a first switch Q1-1, a second switch Q1-2, a third switch Q1-3, a fourth switch Q1-4, a first resonant capacitor Cr1, and a first resonant inductor Lr1.

The first switch Q1-1, the second switch Q1-2, the third switch Q1-3, and the fourth switch Q1-4 are sequentially connected in series. The first capacitor C1 and the second capacitor C2 are connected in series. The first resonant capacitor Cr1 and the first resonant inductor Lr1 are connected in series. One end of the second capacitor C2 is connected to one end of the first switch Q1-1, and the other end of the second capacitor C2 is separately connected to a second end of the third switch Q1-3, a first end of the second switch Q1-2, and one end of the first capacitor C1. The other end of the first capacitor C1 is connected to a second end of the fourth switch Q1-4. One end of the first resonant inductor Lr1 is separately connected to a second end of the first switch Q1-1 and a first end of the third switch Q1-3, and the other end of the first resonant inductor Lr1 is connected to one end of the first resonant capacitor Cr1. The other end of the first resonant capacitor Cr1 is separately connected to a second end of the second switch Q1-2 and a first end of the fourth switch Q1-4.

An operating principle of the circuit shown in FIG. 15 is similar to the descriptions corresponding to FIG. 11 and FIG. 12 in this embodiment. Details are not described herein again.

It can be understood that the first resonant circuit has a plurality of types of structures, the two structures above are merely examples, and a specific structure of the first resonant circuit is not limited herein.

Figure 16:
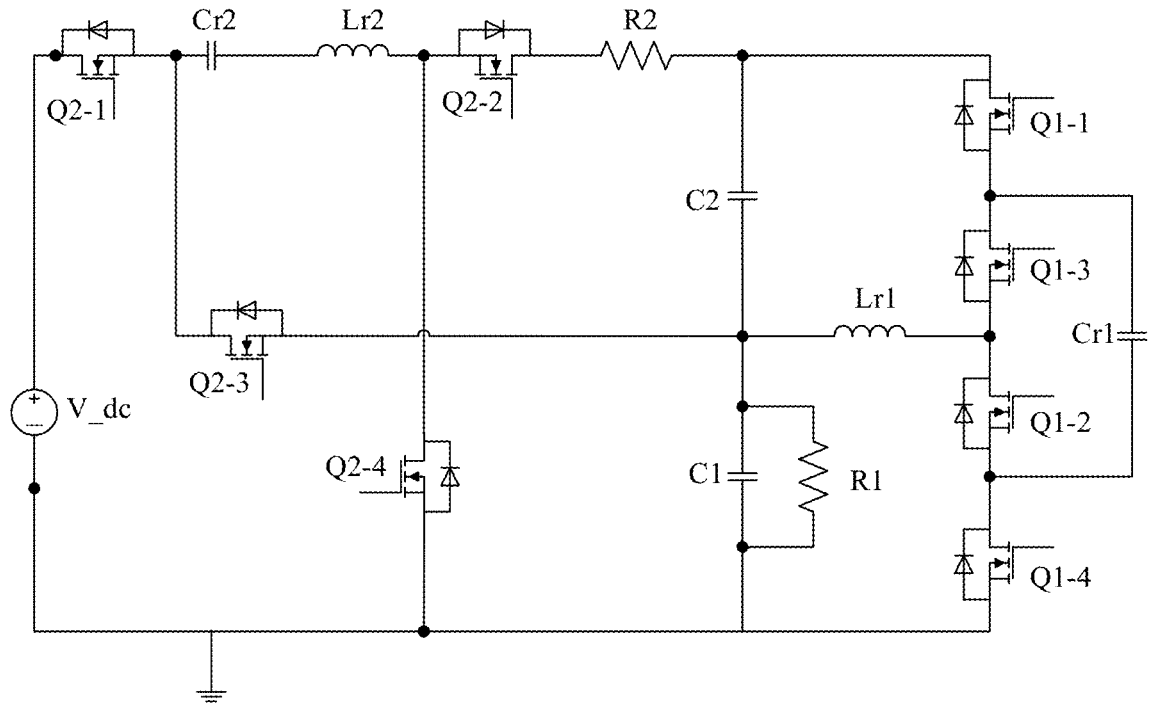
FIG. 16 is a schematic diagram of an eighth embodiment of a converter circuit according to an embodiment of this application.

FIG. 16 is a schematic diagram of an eighth embodiment of the converter circuit provided in the embodiments of this application. Only a first capacitor C1 and a second capacitor C2 may be disposed in the converter circuit. This embodiment of this application provides the eighth embodiment of the converter circuit. The converter circuit includes the first capacitor C1, the second capacitor C2, a first switch Q1-1, a second switch Q1-2, a third switch Q1-3, a fourth switch Q1-4, a fifth switch Q2-1, a sixth switch Q2-2, a seventh switch Q2-3, an eighth switch Q2-4, a first resonant capacitor Cr1, a first resonant inductor Lr1, a second resonant capacitor Cr2, a second resonant inductor Lr2, a first resistor R1, a second resistor R2, and a first direct current power supply V_dc.

The first direct current power supply V_dc, the fifth switch Q2-1, the second resonant capacitor Cr2, the second resonant inductor Lr2, the sixth switch Q2-2, the second resistor R2, the first switch Q1-1, the third switch Q1-3, the second switch Q1-2, and the fourth switch Q1-4 are sequentially connected in series. A first end of the seventh switch Q2-3 is separately connected to a second end of the fifth switch Q2-1 and a first end of the second resonant capacitor Cr2. A second end of the seventh switch Q2-3 is connected to one end of the first resonant inductor Lr1. The other end of the first resonant inductor Lr1 is separately connected to a second end of the third switch Q1-3 and a first end of the second switch Q1-2. A first end of the eighth switch Q2-4 is separately connected to the other end of the second resonant capacitor Cr2 and a first end of the sixth switch Q2-2. A second end of the eighth switch Q2-4 is separately connected to a negative electrode of the first direct current power supply V_dc and a second end of the fourth switch Q1-4. One end of the second capacitor C2 is separately connected to the other end of the second resistor R2 and a first end of the first switch Q1-1, and the other end of the second capacitor C2 is separately connected to the second end of the seventh switch Q2-3, one end of the first resonant inductor Lr1, and one end of the first capacitor C1. The other end of the first capacitor C1 is separately connected to the negative electrode of the first direct current power supply V_dc and the second end of the fourth switch Q1-4. The first resistor R1 and two ends of the first capacitor C1 are connected in parallel. One end of the first resonant capacitor Cr1 is separately connected to a second end of the first switch Q1-1 and a first end of the third switch Q1-3, and the other end of the first resonant capacitor Cr1 is separately connected to a second end of the second switch Q1-2 and a first end of the fourth switch Q1-4.

Turn-on states of the eight switches in this embodiment are similar to those shown in FIG. 6 and FIG. 7. Details are not described herein again.

Figure 17:
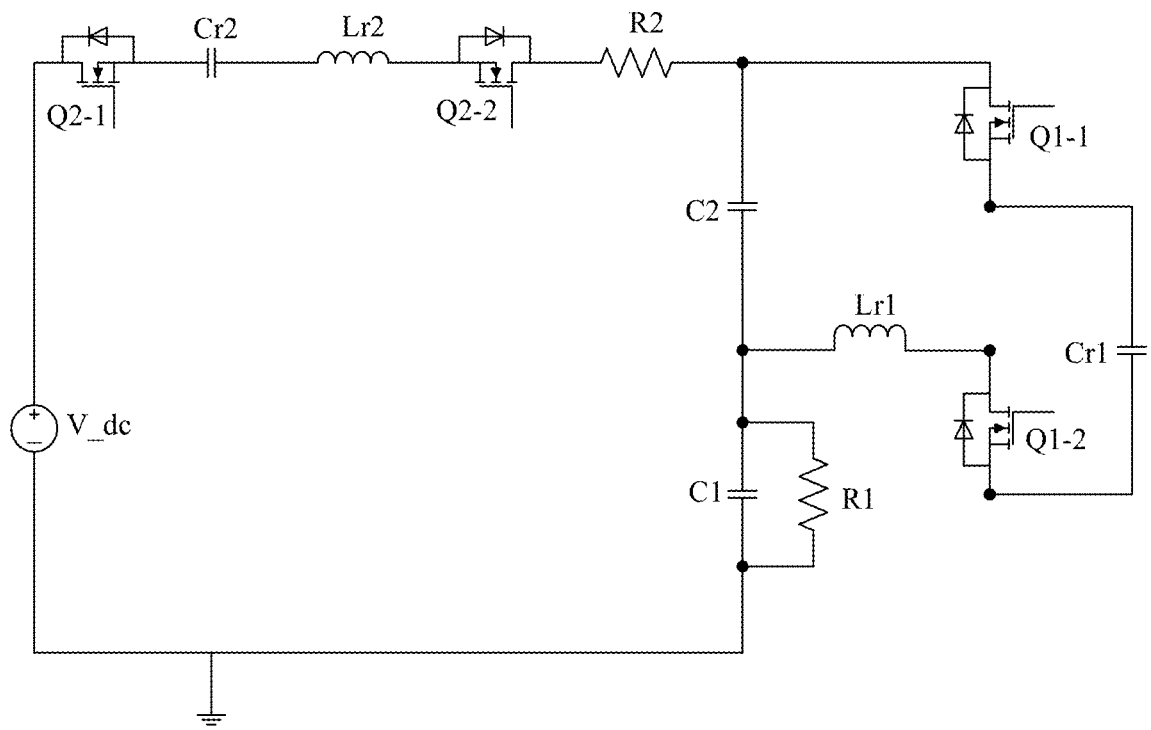
FIG. 17 is an equivalent diagram in a first period in an eighth embodiment of a converter circuit according to an embodiment of this application.

The following uses the in-phase driving shown in FIG. 6 as an example for detailed descriptions:

2.3.1. First Period:

FIG. 16 may be equivalent to FIG. 17. When the first switch Q1-1, the second switch Q1-2, the fifth switch Q2-1, and the sixth switch Q2-2 are turned on (a high level is input) and the third switch Q1-3, the fourth switch Q1-4, the seventh switch Q2-3, and the eighth switch Q2-4 are turned off (a low level is input), energy is transferred between the first direct current power supply V_dc and the second resonant capacitor Cr2, the first capacitor C1, and the second capacitor C2, and between the second capacitor C2 and the first resonant capacitor Cr1, and the first capacitor C1 is charged by the first direct current power supply V_dc through the first resonant tank and the second resonant tank.

Figure 18:
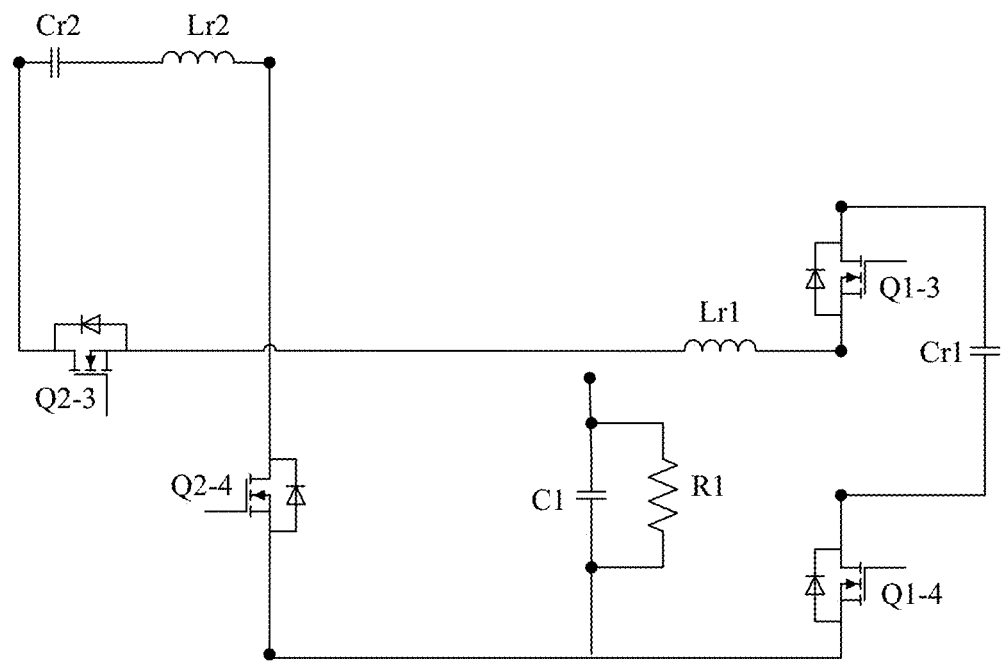
FIG. 18 is an equivalent diagram in a second period in an eighth embodiment of a converter circuit according to an embodiment of this application.

2.3.2. Second Period:

FIG. 16 may be equivalent to FIG. 18. When the third switch Q1-3, the fourth switch Q1-4, the seventh switch Q2-3, and the eighth switch Q2-4 are turned on (a high level is input) and the first switch Q1-1, the second switch Q1-2, the fifth switch Q2-1, and the sixth switch Q2-2 are turned off (a low level is input), the first capacitor C1 is charged by the first resonant capacitor Cr1 and the second resonant capacitor Cr2. In this case, the first capacitor C1 is an output capacitor. Because a duty cycle of a drive signal is close to 50%, a voltage between two ends of the first resonant capacitor Cr1, a voltage between two ends of the second resonant capacitor Cr2, a voltage between two ends of the first capacitor C1, and a voltage between two ends of the second capacitor C2 are equal. Further, because the first capacitor C1, the second capacitor C2, and the second resonant capacitor Cr2 are sequentially connected in series and a total voltage is Vin, it can be concluded, based on the voltage division rule, that the voltage between the two ends of the first capacitor C1, namely, a voltage (an output voltage Vo) between two ends of the first resistor R1 is one third of the input voltage Vin, that is, the ratio of the input voltage Vin to the output voltage Vo is 3:1.

In this embodiment, when the output voltage Vo is the voltage between two ends of the first capacitor C1, the converter circuit is a buck circuit. After the first switch and the second switch are turned on, energy is transferred between the second capacitor and the first resonant circuit. After the fifth switch and the sixth switch are turned on, energy is transferred between the first direct current power supply and the second resonant circuit. After the third switch and the fourth switch are turned on, energy is transferred between the first resonant circuit and the first capacitor. After the seventh switch and the eighth switch are turned on, energy is transferred between the second resonant circuit and the first capacitor. Therefore, a voltage gain is 3:1.

Figure 19:
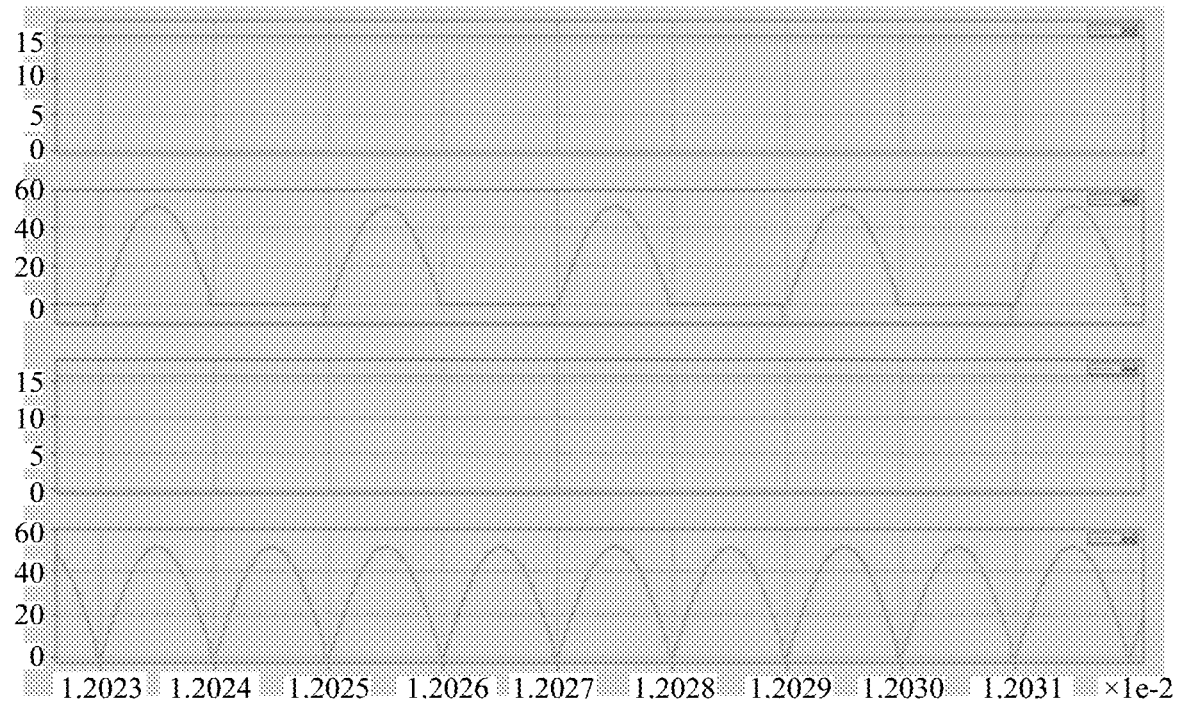
FIG. 19 is a simulation waveform diagram of a converter circuit according to an embodiment of this application.

FIG. 19 is a waveform graph obtained by simulating FIG. 16. A channel 1 indicates the voltage between the two ends of the first capacitor C1. A channel 2 indicates a current flowing through a switch. A channel 3 indicates the voltage between the two ends of the second capacitor C2. A channel 4 indicates a current of the first resonant inductor Lr1.

It can be learned from FIG. 19 that a current waveform in the channel 2 is a half sine wave, that is, the current starts from zero to resonance and ends at zero. Therefore, a current of a switch is zero when the switch is turned on and off. That is, the switch operates in a zero-current switch ZCS state.

For ease of understanding, the following uses N=4 as an example for description.

3. The Ratio of the Input Voltage to the Output Voltage is 4:1.

In the embodiments of this application, the capacitor module of the converter circuit has a plurality of forms which are separately described below:

3.1. The First Capacitor C1, the Second Capacitor C2, the Third Capacitor C3, and a Fourth Capacitor C4 are Sequentially Connected in Series.

Figure 20:
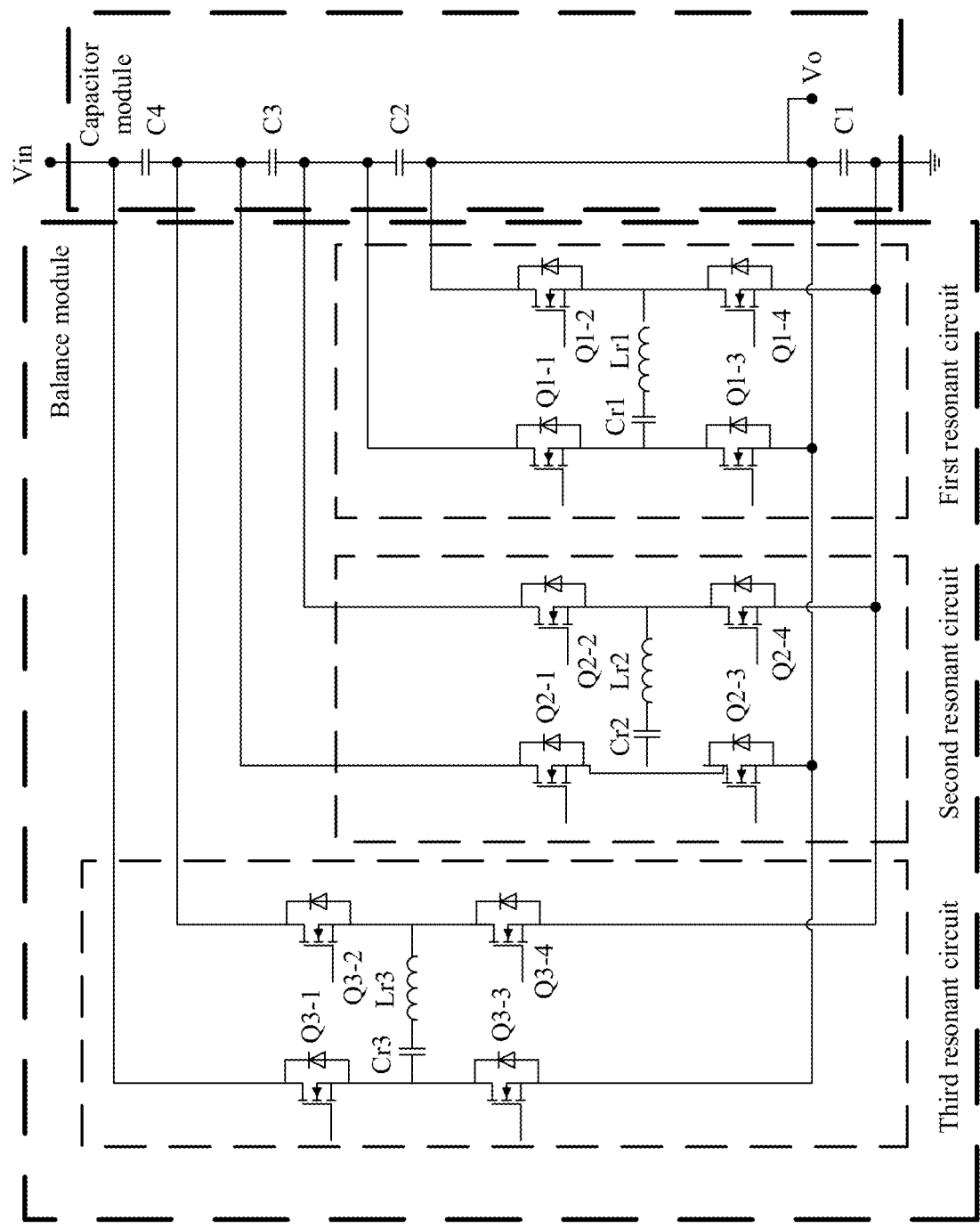
FIG. 20 is a schematic diagram of a ninth embodiment of a converter circuit according to an embodiment of this application.

FIG. 20 is a schematic diagram of a ninth embodiment of the converter circuit provided in the embodiments of this application. This embodiment of this application provides the ninth embodiment of the converter circuit. The converter circuit includes a capacitor module and a balance module.

The balance module includes a first resonant circuit, a second resonant circuit, and a third resonant circuit. The capacitor module includes a first capacitor C1, a second capacitor C2, a third capacitor C3, and a fourth capacitor C4. The first resonant circuit includes at least four switches and a first resonant tank. The four switches are a first switch Q1-1, a second switch Q1-2, a third switch Q1-3, and a fourth switch Q1-4. The first resonant tank includes a first resonant capacitor Cr1 and a first resonant inductor Lr1. The second resonant circuit includes at least four switches and a second resonant tank. The four switches are a fifth switch Q2-1, a sixth switch Q2-2, a seventh switch Q2-3, and an eighth switch Q2-4. The second resonant tank includes a second resonant capacitor Cr2 and a second resonant inductor Lr2. The third resonant circuit includes at least four switches and a third resonant tank. The four switches are a ninth switch Q3-1, a tenth switch Q3-2, an eleventh switch Q3-3, and a twelfth switch Q3-4. The third resonant tank includes a third resonant capacitor Cr3 and a second resonant inductor Lr3.

The first capacitor C1, the second capacitor C2, the third capacitor C3, and the fourth capacitor C4 are sequentially connected in series. The first switch Q1-1 and the third switch Q1-3 are connected in series. The second switch Q1-2 and the fourth switch Q1-4 are connected in series. The fifth switch Q2-1 and the seventh switch Q2-3 are connected in series. The sixth switch Q2-2 and the eighth switch Q2-4 are connected in series. The ninth switch Q3-1 and the eleventh switch Q3-3 are connected in series. The tenth switch Q3-2 and the twelfth switch Q3-4 are connected in series.

A first end of the ninth switch Q3-1 is connected to one end of the fourth capacitor C4, and a first end of the tenth switch Q3-2 is connected to the other end of the fourth capacitor C4. A first end of the fifth switch Q2-1 is connected to one end of the third capacitor C3, and a first end of the sixth switch Q2-2 is connected to the other end of the third capacitor C3. A first end of the first switch Q1-1 is connected to one end of the second capacitor C2, and a first end of the second switch Q1-2 is connected to the other end of the second capacitor C2.

One end of the first capacitor C1 is separately connected to a second end of the eleventh switch Q3-3, a second end of the seventh switch Q2-3, and a second end of the third switch Q1-3, and the other end of the first capacitor C1 is separately connected to a second end of the twelfth switch Q3-4, a second end of the eighth switch Q2-4, and a second end of the fourth switch Q1-4.

One end of the first resonant tank is separately connected to a second end of the first switch Q1-1 and a first end of the third switch Q1-3, and the other end of the first resonant tank is separately connected to a second end of the second switch Q1-2 and the second end of the fourth switch Q1-4. One end of the second resonant tank is separately connected to a second end of the fifth switch Q2-1 and a first end of the seventh switch Q2-3, and the other end of the second resonant tank is separately connected to a second end of the sixth switch Q2-2 and the second end of the eighth switch Q2-4. One end of the third resonant tank is separately connected to a second end of the ninth switch Q3-1 and a first end of the eleventh switch Q3-3, and the other end of the third resonant tank is separately connected to a second end of the tenth switch Q3-2 and a second end of the twelfth switch Q3-4.

Similar to that shown in FIG. 2D, the tenth switch Q3-2 and the twelfth switch Q3-4 in this embodiment of this application may be replaced with diodes.

Figure 21:
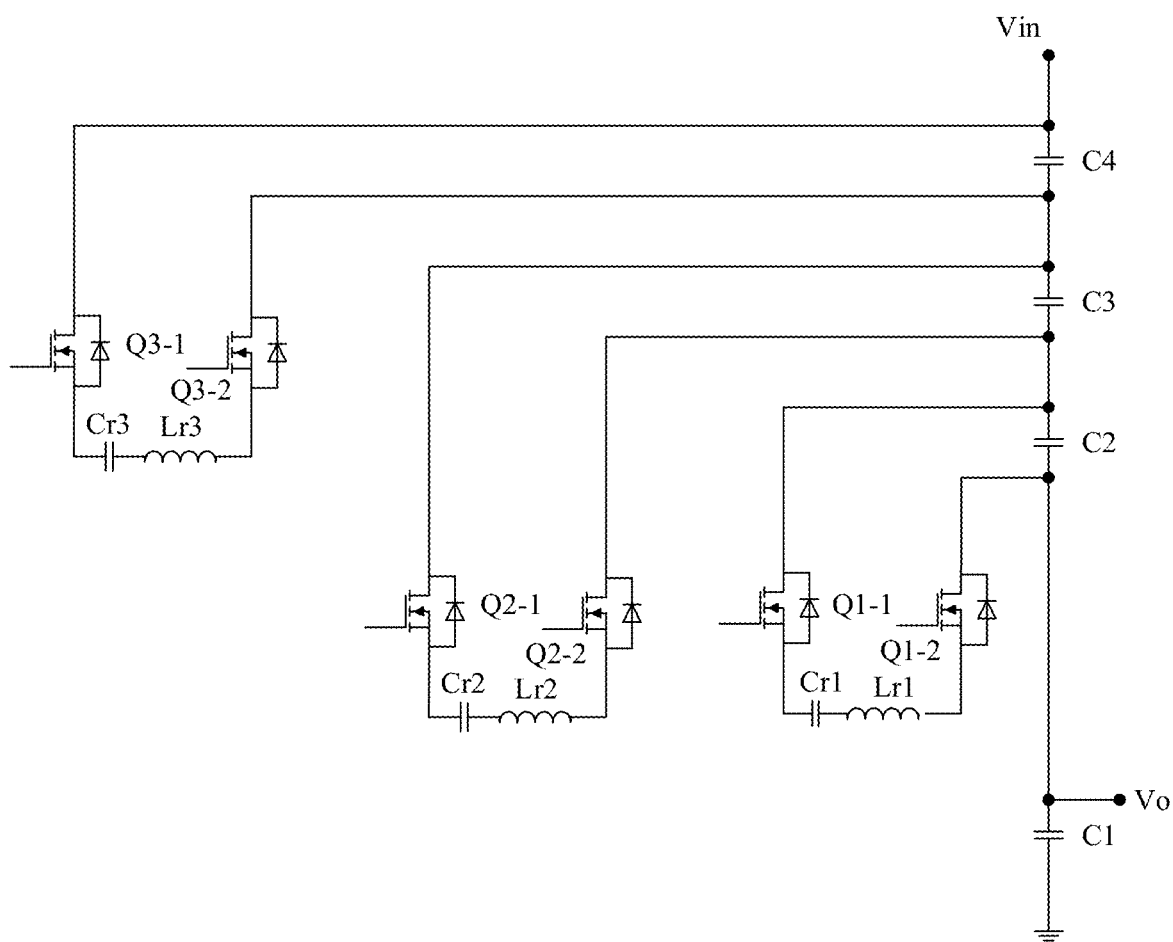
FIG. 21 is an equivalent diagram in a first period in a ninth embodiment of a converter circuit according to an embodiment of this application.

The following uses in-phase driving of switches as an example for detailed descriptions of an operating principle in this embodiment:

3.1.1. First Period:

FIG. 20 may be equivalent to FIG. 21. When the first switch Q1-1, the second switch Q1-2, the fifth switch Q2-1, the sixth switch Q2-2, the ninth switch Q3-1, and the tenth switch Q3-2 are turned on (a high level is input), and the third switch Q1-3, the fourth switch Q1-4, the seventh switch Q2-3, the eighth switch Q2-4, the eleventh switch Q3-3, and the twelfth switch Q3-4 are turned off (a low level is input), energy is transferred between the second capacitor C2 and the first resonant capacitor Cr1, between the third capacitor C3 and the second resonant capacitor Cr2, and between the fourth capacitor C4 and the third resonant capacitor Cr3. The first capacitor C1 is charged with an input voltage Vin through the first resonant tank, the second resonant tank, and the third resonant tank.

Figure 22:
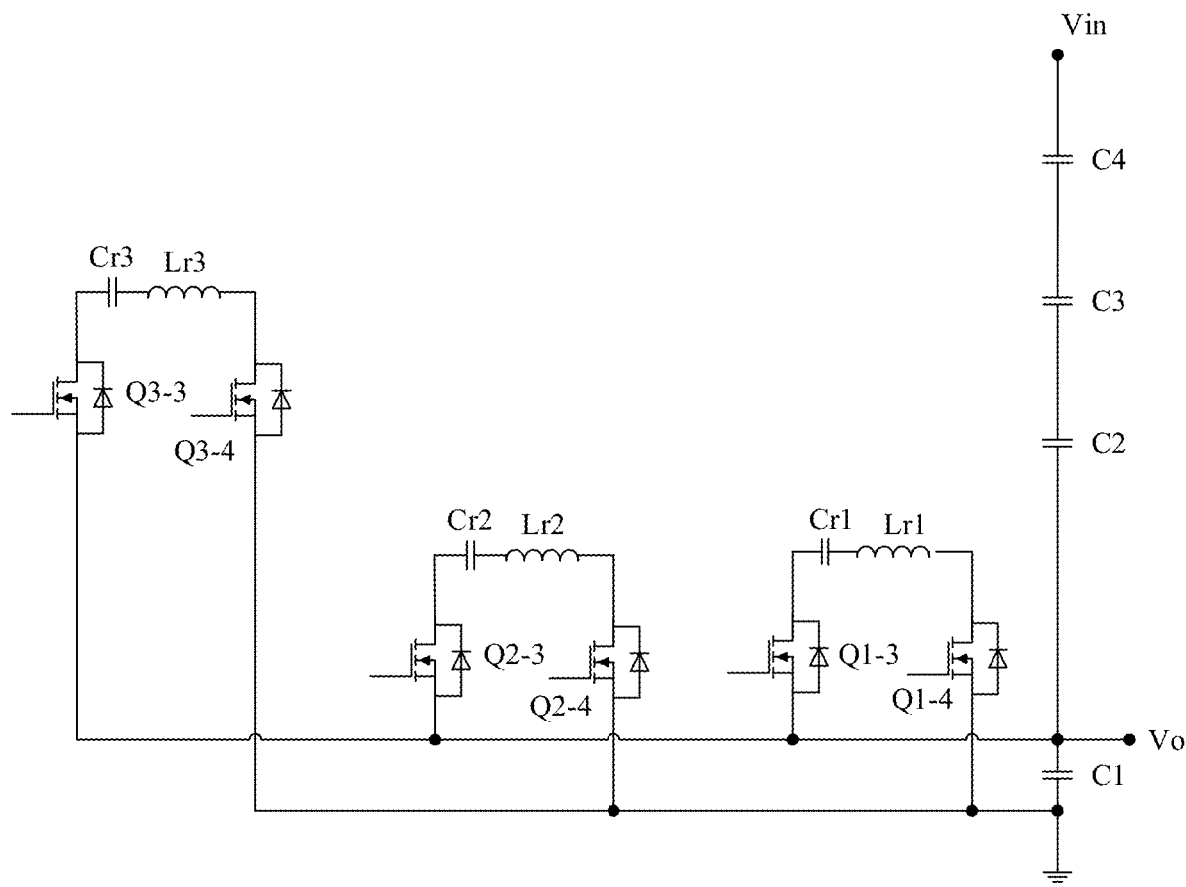
FIG. 22 is an equivalent diagram in a second period in a ninth embodiment of a converter circuit according to an embodiment of this application.

3.1.2. Second Period:

FIG. 20 may be equivalent to FIG. 22. When the third switch Q1-3, the fourth switch Q1-4, the seventh switch Q2-3, the eighth switch Q2-4, the eleventh switch Q3-3, and the twelfth switch Q3-4 are turned off (a high level is input), and the first switch Q1-1, the second switch Q1-2, the fifth switch Q2-1, the sixth switch Q2-2, the ninth switch Q3-1, and the tenth switch Q3-2 are turned off (a low level is input), the first capacitor C1 is charged by the first resonant circuit, the second resonant circuit, and the third resonant circuit. In this case, the first capacitor C1 is an output capacitor. Because a duty cycle of a drive signal is close to 50%, a voltage between two ends of the first resonant capacitor Cr1, a voltage between two ends of the second resonant capacitor Cr2, and a voltage between two ends of the third resonant capacitor Cr3 are equal, that is, a voltage between two ends of the first capacitor C1 is equal to a voltage between two ends of the second capacitor C2, a voltage between two ends of the third capacitor C3, and a voltage between two ends of the fourth capacitor C4. Further, because the first capacitor C1, the second capacitor C2, the third capacitor C3 and the fourth capacitor C4 are sequentially connected in series and a total voltage is Vin, it can be concluded, based on the voltage division rule, that a voltage (an output voltage Vo) between the two ends of the first capacitor C1 is a quarter of an input voltage Vin, that is, the ratio of the input voltage Vin to the output voltage Vo is 4:1.

In this embodiment of this application, the balance module controls each switch in the first resonant circuit, so that each switch works with the first resonant tank to affect a current, to balance a voltage between two ends of the first capacitor and a voltage between two ends of the second capacitor. The balance module controls each switch in the second resonant circuit, so that each switch works with the second resonant tank to affect a current, to balance the voltage between the two ends of the first capacitor and a voltage between two ends of the third capacitor. The balance module controls each switch in the third resonant circuit, so that each switch works with the third resonant tank to affect a current, to balance the voltage between the two ends of the first capacitor and a voltage between two ends of the fourth capacitor. Then, a voltage gain 4:1 is obtained based on the voltage division rule in which four capacitors in the capacitor module are connected in series.

3.2. The First Capacitor C1, the Second Capacitor C2, and the Third Capacitor C3 are Connected in Series, and then the Three Capacitors and the Fourth Capacitor C4 are Connected in Parallel.

Figure 23:
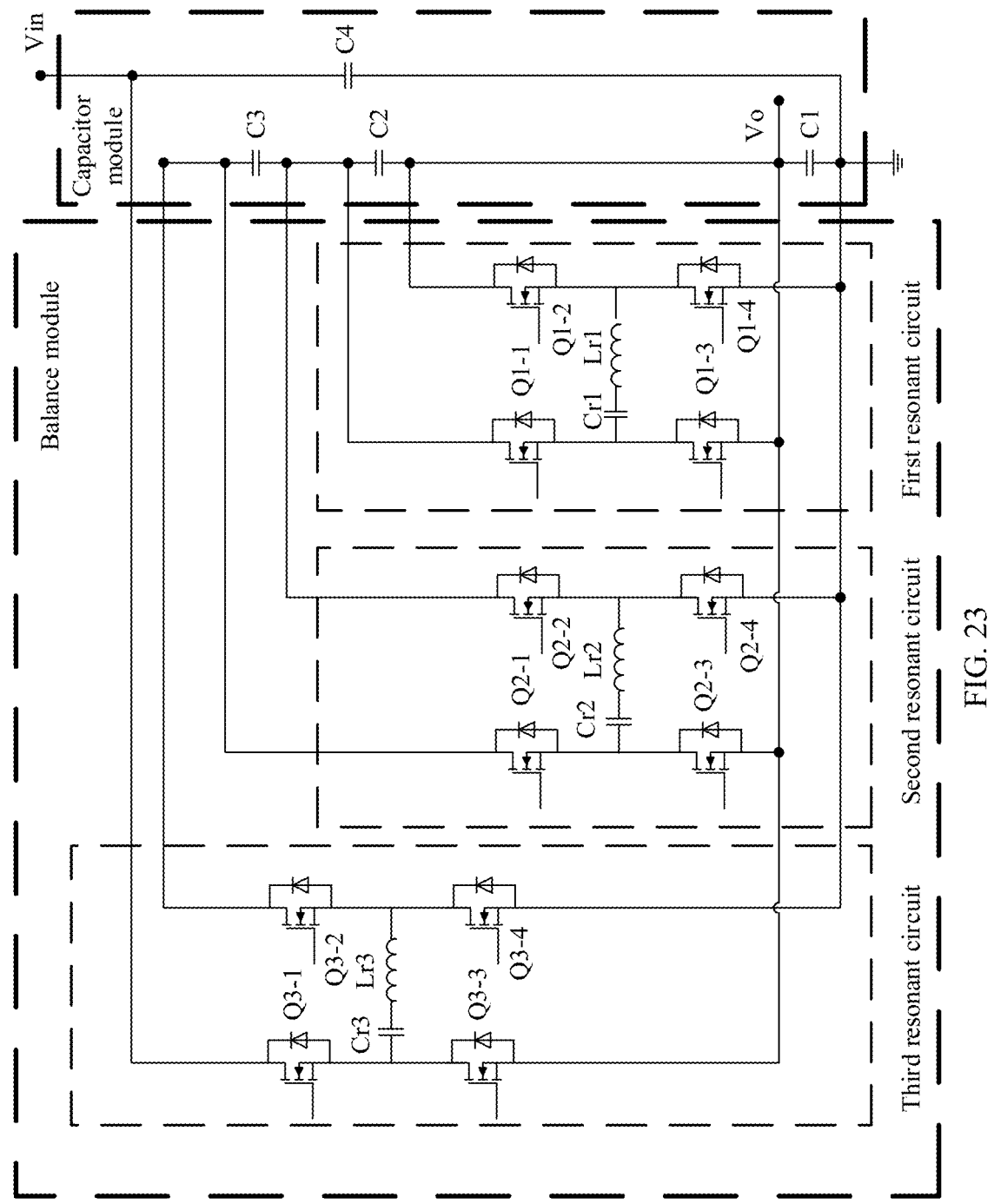
FIG. 23 is a schematic diagram of a tenth embodiment of a converter circuit according to an embodiment of this application.

FIG. 23 is a schematic diagram of a tenth embodiment of the converter circuit provided in the embodiments of this application. This embodiment of this application provides the tenth embodiment of the converter circuit. Components in this embodiment are similar to those in FIG. 20. Details are not described herein again. A difference lies in a connection mode of the fourth capacitor C4. The following describes a specific structure of the converter circuit.

The first capacitor C1, the second capacitor C2, and the third capacitor C3 are connected in series, and then the three capacitors and the fourth capacitor C4 are connected in parallel. The first switch Q1-1 and the third switch Q1-3 are connected in series. The second switch Q1-2 and the fourth switch Q1-4 are connected in series. The fifth switch Q2-1 and the seventh switch Q2-3 are connected in series. The sixth switch Q2-2 and the eighth switch Q2-4 are connected in series. The ninth switch Q3-1 and the eleventh switch Q3-3 are connected in series. The tenth switch Q3-2 and the twelfth switch Q3-4 are connected in series.

The first end of the ninth switch Q3-1 is connected to one end of the fourth capacitor C4. The first end of the tenth switch Q3-2 is separately connected to one end of the third capacitor C3 and the first end of the fifth switch Q2-1. The first end of the sixth switch Q2-2 is connected to the other end of the third capacitor C3. The first end of the first switch Q1-1 is connected to one end of the second capacitor C2. The first end of the second switch Q1-2 is connected to the other end of the second capacitor C2.

One end of the first capacitor C1 is separately connected to a second end of the eleventh switch Q3-3, the second end of the seventh switch Q2-3, and the second end of the third switch Q1-3, and the other end of the first capacitor C1 is separately connected to the second end of the twelfth switch Q3-4, the second end of the eighth switch Q2-4, and the second end of the fourth switch Q1-4.

One end of the first resonant tank is separately connected to the second end of the first switch Q1-1 and the first end of the third switch Q1-3, and the other end of the first resonant tank is separately connected to the second end of the second switch Q1-2 and the second end of the fourth switch Q1-4. One end of the second resonant tank is separately connected to the second end of the fifth switch Q2-1 and the first end of the seventh switch Q2-3, and the other end of the second resonant tank is separately connected to the second end of the sixth switch Q2-2 and the second end of the eighth switch Q2-4. One end of the third resonant tank is separately connected to the second end of the ninth switch Q3-1 and the first end of the eleventh switch Q3-3, and the other end of the third resonant tank is separately connected to the second end of the tenth switch Q3-2 and the second end of the twelfth switch Q3-4.

Figure 24:
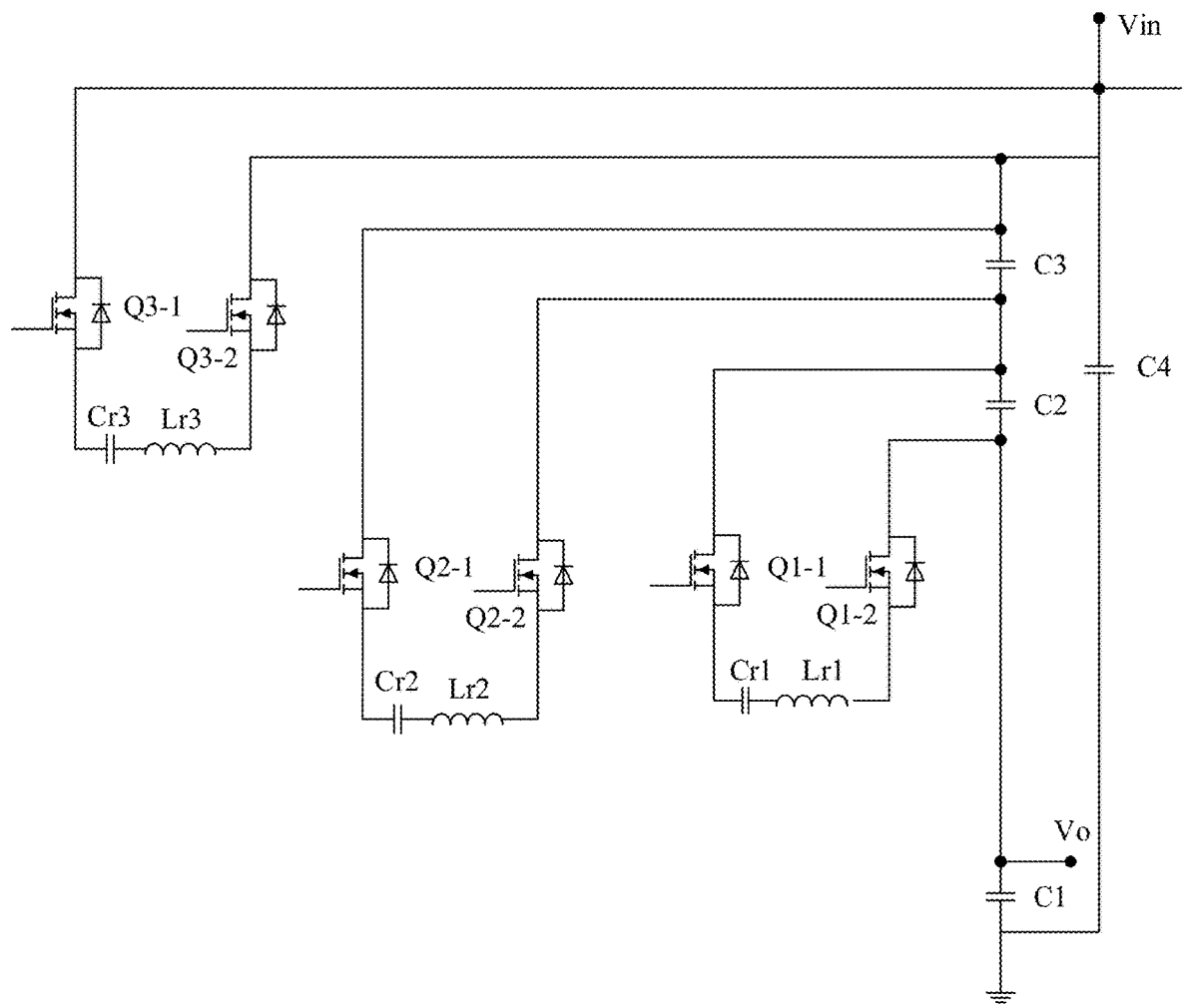
FIG. 24 is an equivalent diagram in a first period in a tenth embodiment of a converter circuit according to an embodiment of this application.

An operating principle in this embodiment is as follows:

3.2.1. First Period:

FIG. 23 may be equivalent to FIG. 24, and is different from FIG. 11 in that the fourth capacitor C4 and the third resonant circuit are added in this embodiment. The principle is similar to that corresponding to FIG. 11. Details are not described herein again.

Figure 25:
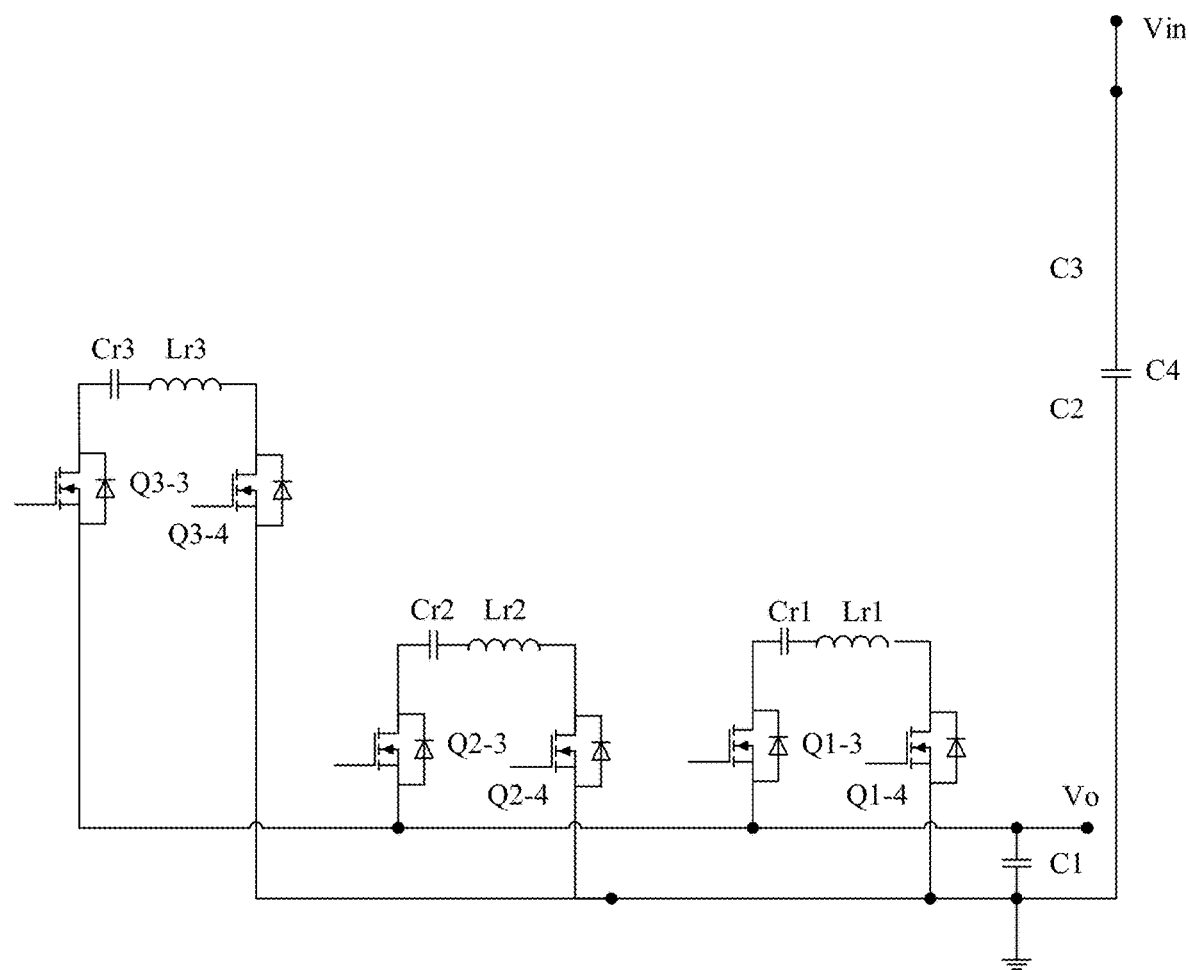
FIG. 25 is an equivalent diagram in a second period in a tenth embodiment of a converter circuit according to an embodiment of this application.

3.2.2. Second Period:

FIG. 23 may be equivalent to FIG. 25, and is different from FIG. 12 in that the fourth capacitor C4 and the third resonant circuit are added in this embodiment. The principle is similar to that corresponding to FIG. 11. Details are not described herein again. The ratio of the input voltage to the output voltage is 4:1.

3.3. The First Capacitor C1, the Second Capacitor C2, the Third Capacitor C3, and the Fourth Capacitor C4 are Sequentially Connected in Series, and then the Four Capacitors and the Direct Current Power Supply V_dc are Connected in Parallel.

Figure 26:
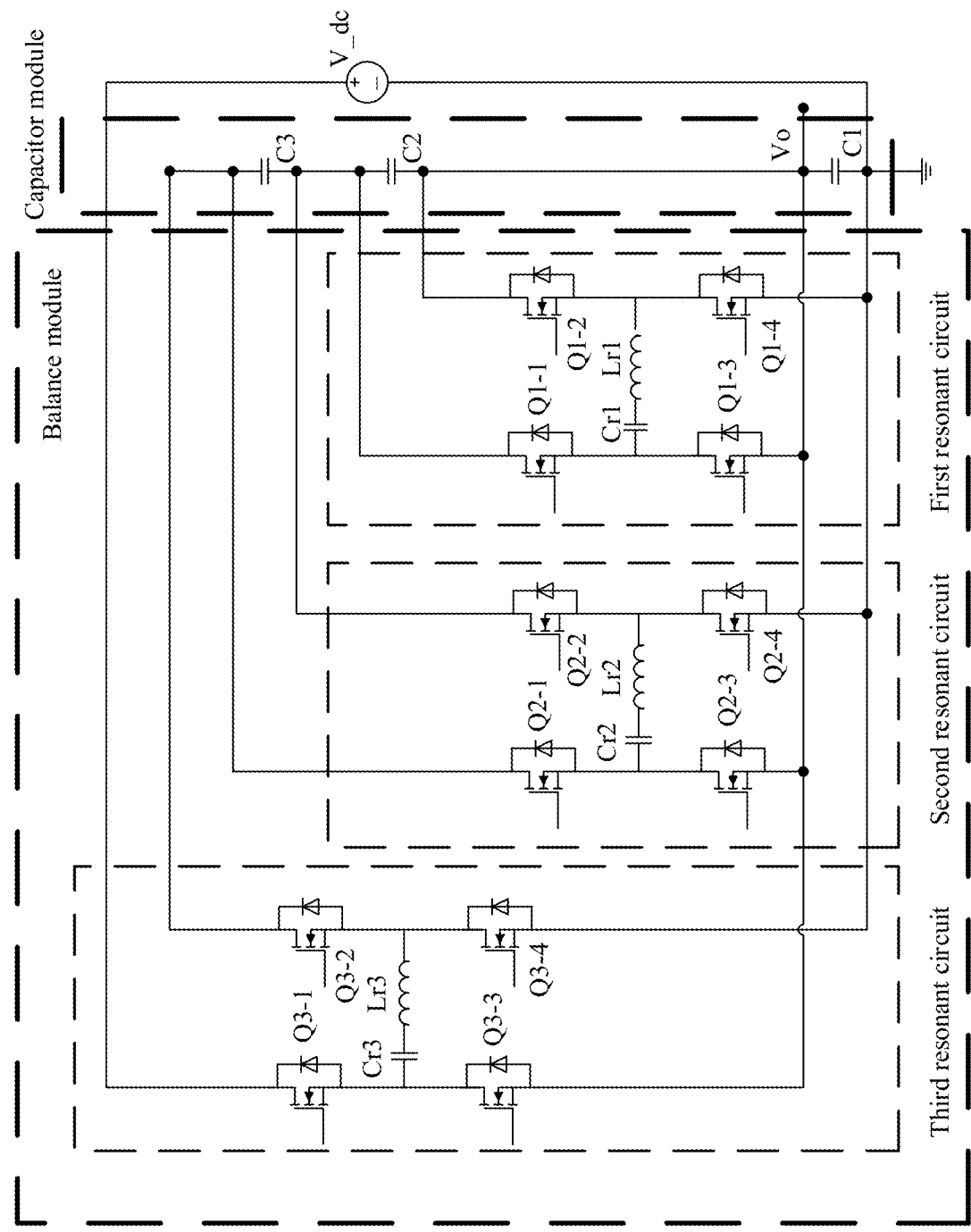
FIG. 26 is a schematic diagram of an eleventh embodiment of a converter circuit according to an embodiment of this application.

FIG. 26 is a schematic diagram of an eleventh embodiment of the converter circuit provided in the embodiments of this application. This embodiment of this application provides an eleventh embodiment of the converter circuit. Components in this embodiment are similar to those in FIG. 23. Details are not described herein again. A difference lies in that the fourth capacitor C4 is replaced with a direct current power supply V_dc (as shown in FIG. 26).

In this embodiment, after the first switch Q1-1 and the second switch Q1-2 are turned on, the second capacitor 2 charges the first resonant circuit. After the third switch Q1-3 and the fourth switch Q1-4 are turned on, energy is transferred between the first resonant circuit and the first capacitor C1. After the fifth switch Q2-1 and the sixth switch Q2-2 are turned on, energy is transferred between the third capacitor C3 and the second resonant circuit. After the seventh switch Qn-3 and the eighth switch Qn-4 are turned on, energy is transferred between the second resonant circuit and the first capacitor C1. After the ninth switch Q3-1 and the tenth switch Q3-2 are turned on, the third resonant circuit is charged by the direct current power supply V_dc. After the eleventh switch Q3-3 and the twelfth switch Q3-4 are turned on, energy is transferred between the third resonant circuit and the first capacitor C1. Then, a voltage gain is 4:1 (a detailed principle is similar to that corresponding to FIG. 24 and FIG. 25, and details are not described herein again).

The buck converter circuit is described above, and the boost converter circuit is described below:

II. Boost Converter Circuit (a Voltage Between Two Ends of a First Capacitor is an Input Voltage, and a Voltage Between Two Ends of a Capacitor Module is an Output Voltage)

The boost converter circuit and the buck converter circuit have similar components and similar component connection relationships. The components and the component connection relationships are not described herein again. In the boost converter circuit and the buck converter circuit, only Vin and Vo are exchanged. The following describes a boosting principle.

For ease of understanding, different voltage transformation ratios are separately described below:

1. The Ratio of the Input Voltage to the Output Voltage is 1:N.

Figure 27:
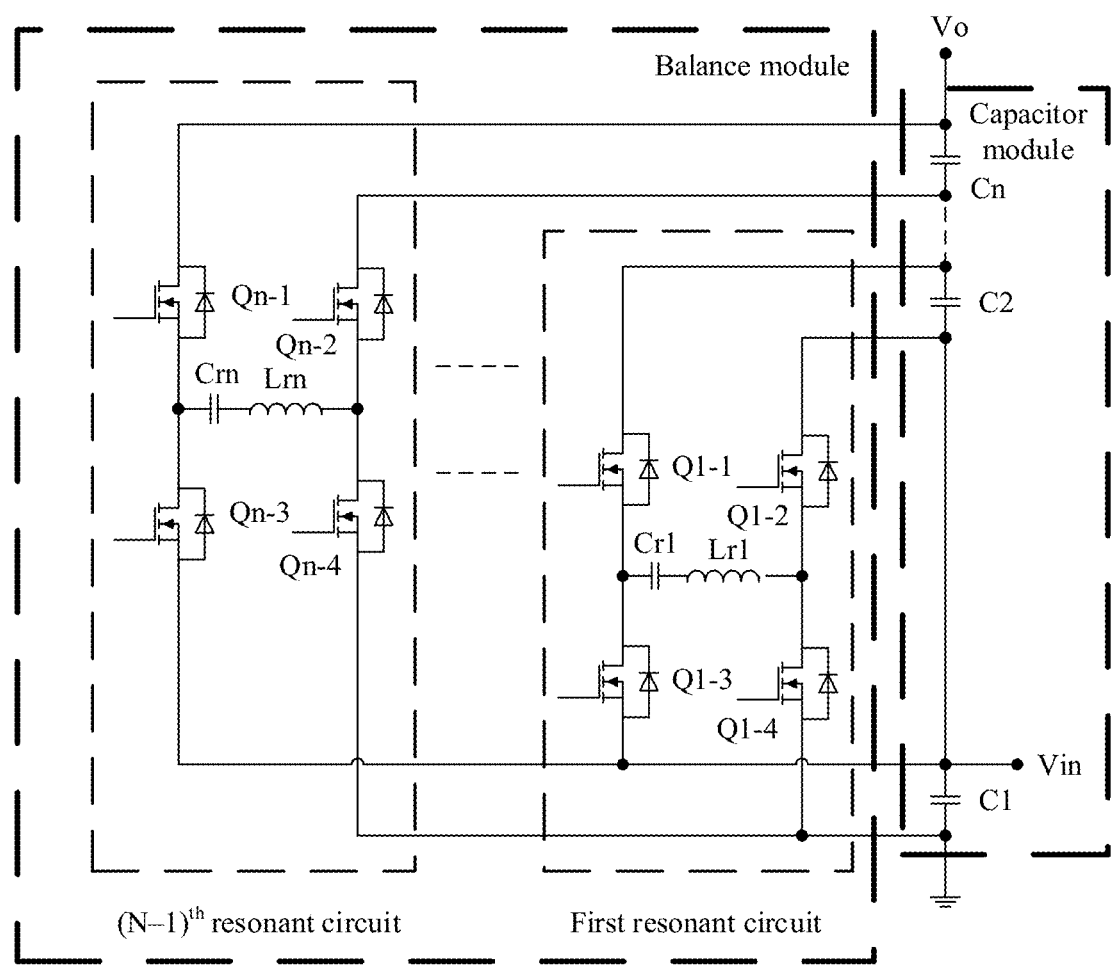
FIG. 27 is a schematic diagram of a twelfth embodiment of a converter circuit according to an embodiment of this application.

FIG. 27 is a schematic diagram of a twelfth embodiment of the converter circuit provided in the embodiments of this application. This embodiment of this application provides the twelfth embodiment of the converter circuit. Components and component connection relationships in this embodiment are similar to those corresponding to the N:1. Details are not described herein again. A difference lies in that Vin and Vo are exchanged (as shown in FIG. 27). In the following, only a boost converter circuit corresponding to the buck converter circuit shown in FIG. 2 is described as an example, and the boost converter circuits corresponding to FIG. 3 and FIG. 4 are not described herein again.

In this embodiment, when the input voltage Vin is a voltage between two ends of a first capacitor C1 and the output voltage Vo is a voltage between two ends of capacitors C1 to Cn that are connected in series, the circuit is a boost circuit.

In this embodiment, after the third switch Q1-3 and the fourth switch Q1-4 are turned on, the first resonant circuit is charged by the first capacitor C1. After the seventh switch Qn-3 and the eighth switch Qn-4 are turned on, the $(N-1)^{th}$ resonant circuit is charged by the first capacitor C1. After the first switch Q1-1 and the second switch Q1-2 are turned on, the second capacitor C2 is charged by the first resonant circuit. After the fifth switch Qn-1 and the sixth switch Qn-2 are turned on, an $N^{th}$ capacitor Cn is charged by the $(N-1)^{th}$ resonant circuit. Therefore, the voltage between two ends of the $N^{th}$ capacitor Cn is equal to the voltage between two ends of the first capacitor C1, and the voltage between two ends of the second capacitor C2 is equal to the voltage between the two ends of the first capacitor C1. Further, because the first capacitor C1, the second capacitor C2, and the $N^{th}$ capacitor Cn are sequentially connected in series, a voltage from two ends of the first capacitor C1 to two ends of the $N^{th}$ capacitor Cn is N times as much as the voltage between the two ends of the first capacitor C1, so that the output voltage Vo is N times as much as the input voltage Vin, that is, a voltage gain is N:1 (Vin:Vo=N:1).

For ease of understanding, the following also uses N=3 as an example for detailed descriptions.

2. The Ratio of the Input Voltage to the Output Voltage is 1:3.

Figure 28:
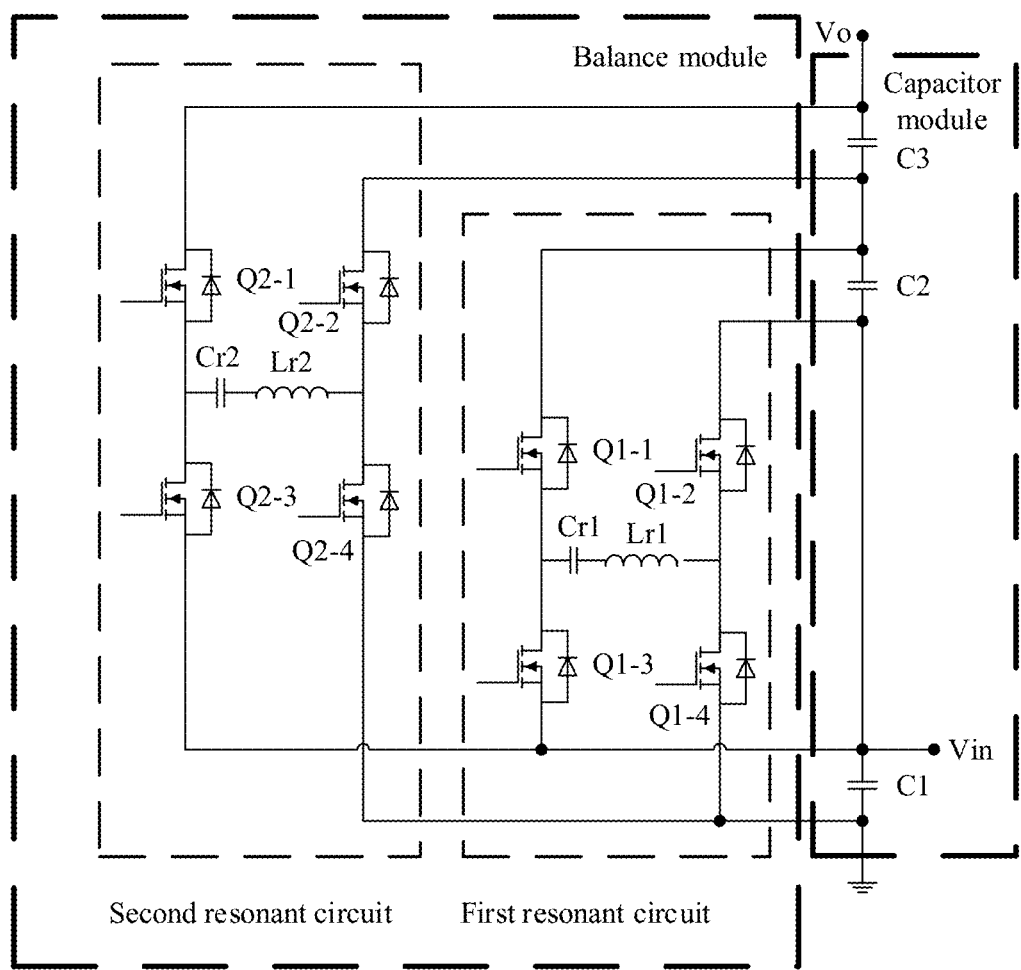
FIG. 28 is a schematic diagram of a thirteenth embodiment of a converter circuit according to an embodiment of this application.

FIG. 28 is a schematic diagram of a thirteenth embodiment of the converter circuit provided in the embodiments of this application. This embodiment of this application provides the thirteenth embodiment of the converter circuit. Components and component connection relationships in this embodiment are similar to those corresponding to FIG. 5. Details are not described herein again. A difference lies in that Vin and Vo are exchanged (as shown in FIG. 28). In the following, only a boost converter circuit corresponding to the buck converter circuit shown in FIG. 5 is described as an example, and the boost converter circuits corresponding to FIG. 10 and FIG. 13 are not described herein again.

Figure 29:
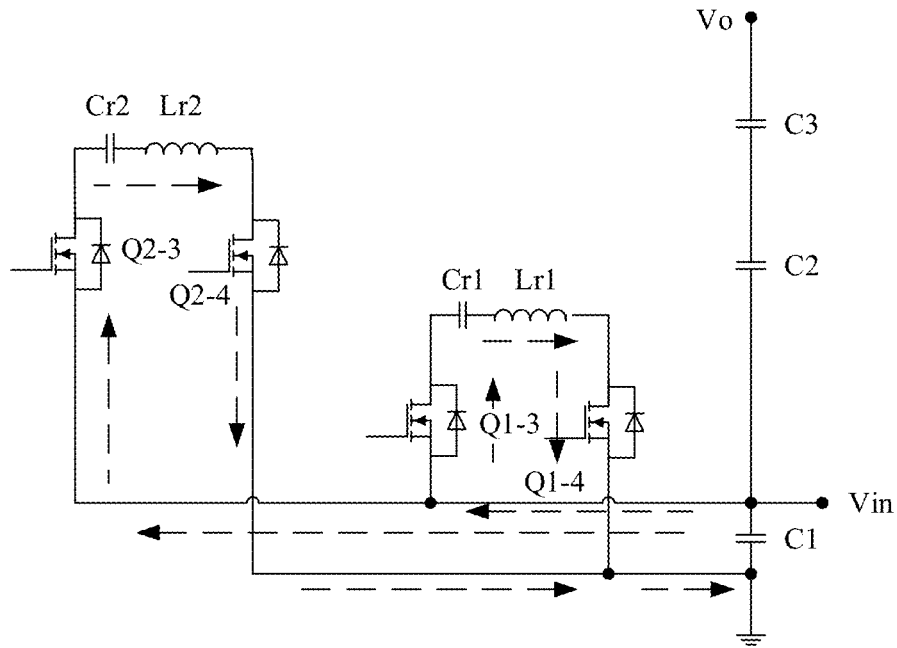
FIG. 29 is an equivalent diagram in a first period in a thirteenth embodiment of a converter circuit according to an embodiment of this application.

The following uses in-phase driving of switches as an example for detailed descriptions of an operating principle in this embodiment:

2.1. First Period:

FIG. 28 may be equivalent to FIG. 29. When the third switch Q1-3, the fourth switch Q1-4, the seventh switch Q2-3, and the eighth switch Q2-4 are turned on (a high level is input) and the first switch Q1-1, the second switch Q1-2, the fifth switch Q2-1, and the sixth switch Q2-2 are turned off (a low level is input), the first resonant capacitor Cr1 and the second resonant capacitor Cr2 are charged by the first capacitor C1.

Figure 30:
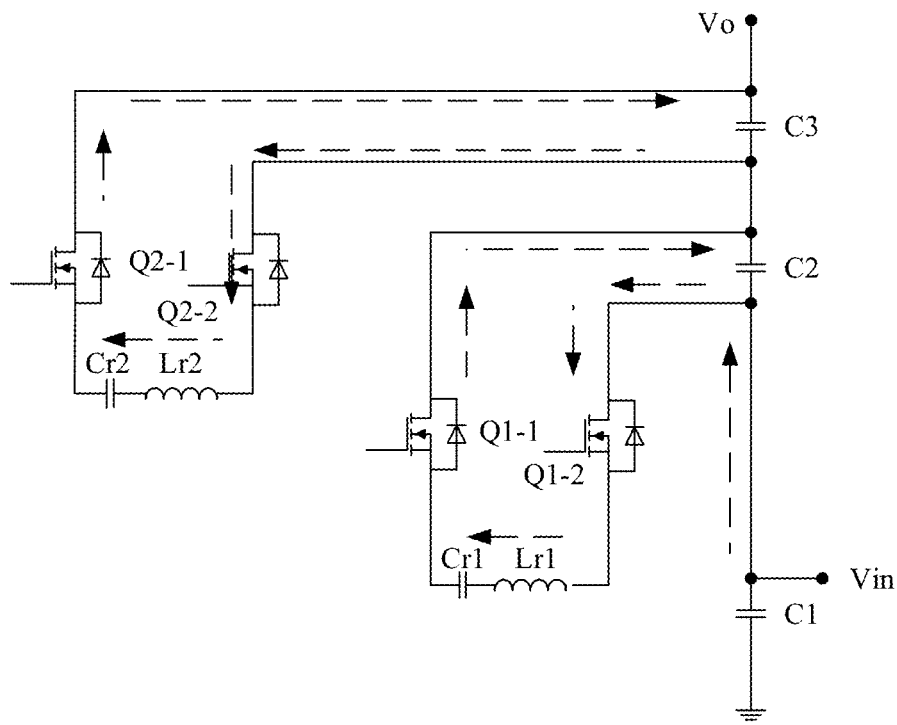
FIG. 30 is an equivalent diagram in a second period in a thirteenth embodiment of a converter circuit according to an embodiment of this application.

2.2. Second Period:

FIG. 28 may be equivalent to FIG. 30. When the first switch Q1-1, the second switch Q1-2, the fifth switch Q2-1, and the sixth switch Q2-2 are turned on (a high level is input), and the third switch Q1-3, the fourth switch Q1-4, the seventh switch Q2-3, and the eighth switch Q2-4 are turned off (a low level is input), the second capacitor C2 and the third capacitor C3 are charged by the first resonant capacitor Cr1. In this case, the first capacitor C1 is an input capacitor. Because the voltage between the two ends of the first resonant capacitor Cr1 is equal to the voltage between the two ends of the first capacitor C1 and the second capacitor C2 is charged by the first resonant capacitor Cr1, the voltage between the two ends of the second capacitor C2 is equal to the voltage between the two ends of the first capacitor C1. Similarly, the voltage between the two ends of the third capacitor C3 is equal to the voltage between the two ends of the first capacitor C1, that is, the voltage between the two ends of the first capacitor C1, the voltage between the two ends of the second capacitor C2, and the voltage between the two ends of the third capacitor C3 are equal. Therefore, a voltage from the two ends of the first capacitor C1 to the two ends of the third capacitor C3 is three times as much as the voltage between the two ends of the first capacitor C1. In other words, the output voltage Vo is three times as much as the input voltage Vin, that is, a voltage gain is 3:1 (Vin:Vo=3:1).

For ease of understanding, the following also uses N=4 as an example for detailed descriptions.

Figure 31:
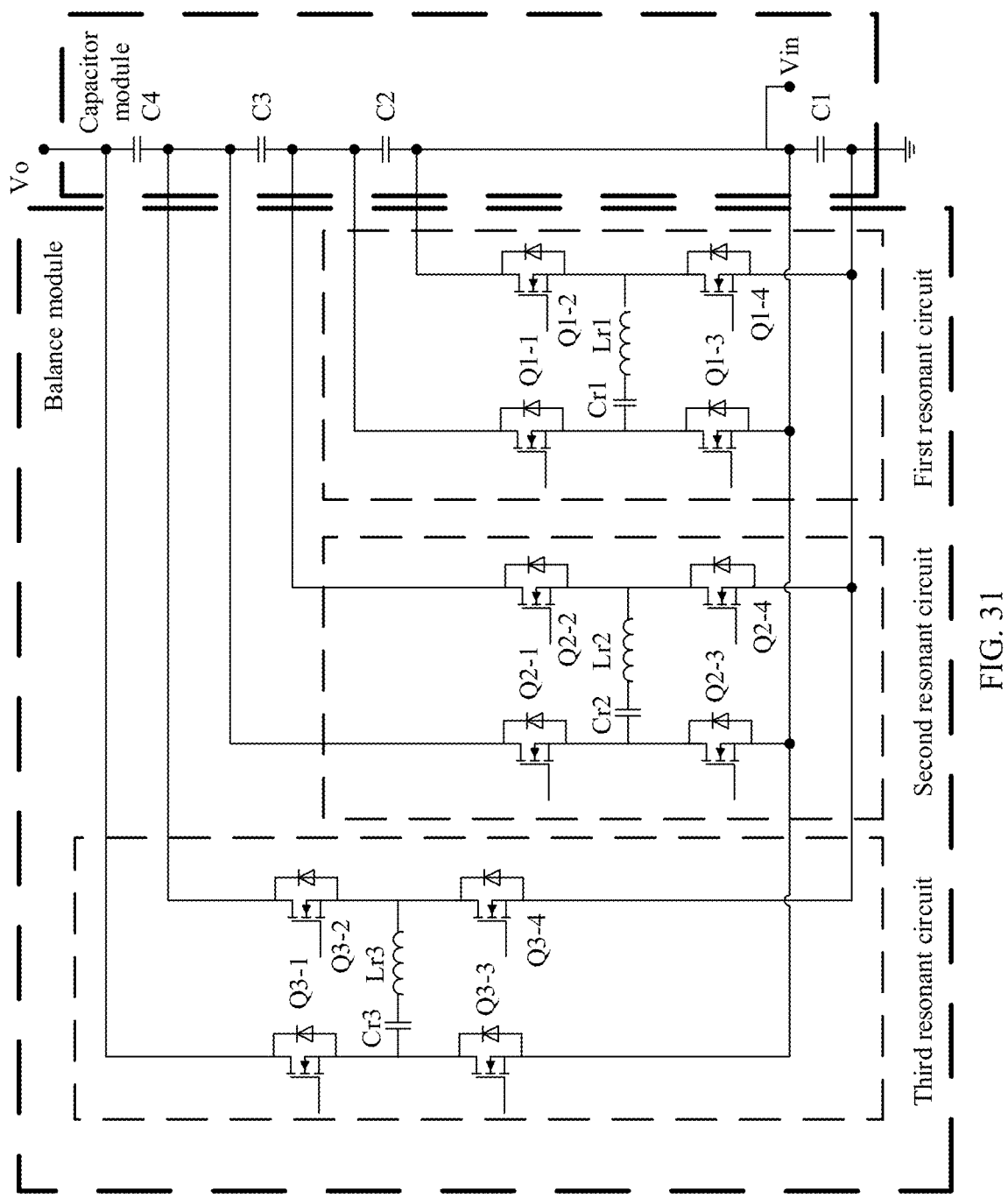
FIG. 31 is a schematic diagram of a fourteenth embodiment of a converter circuit according to an embodiment of this application.
Figure 32:
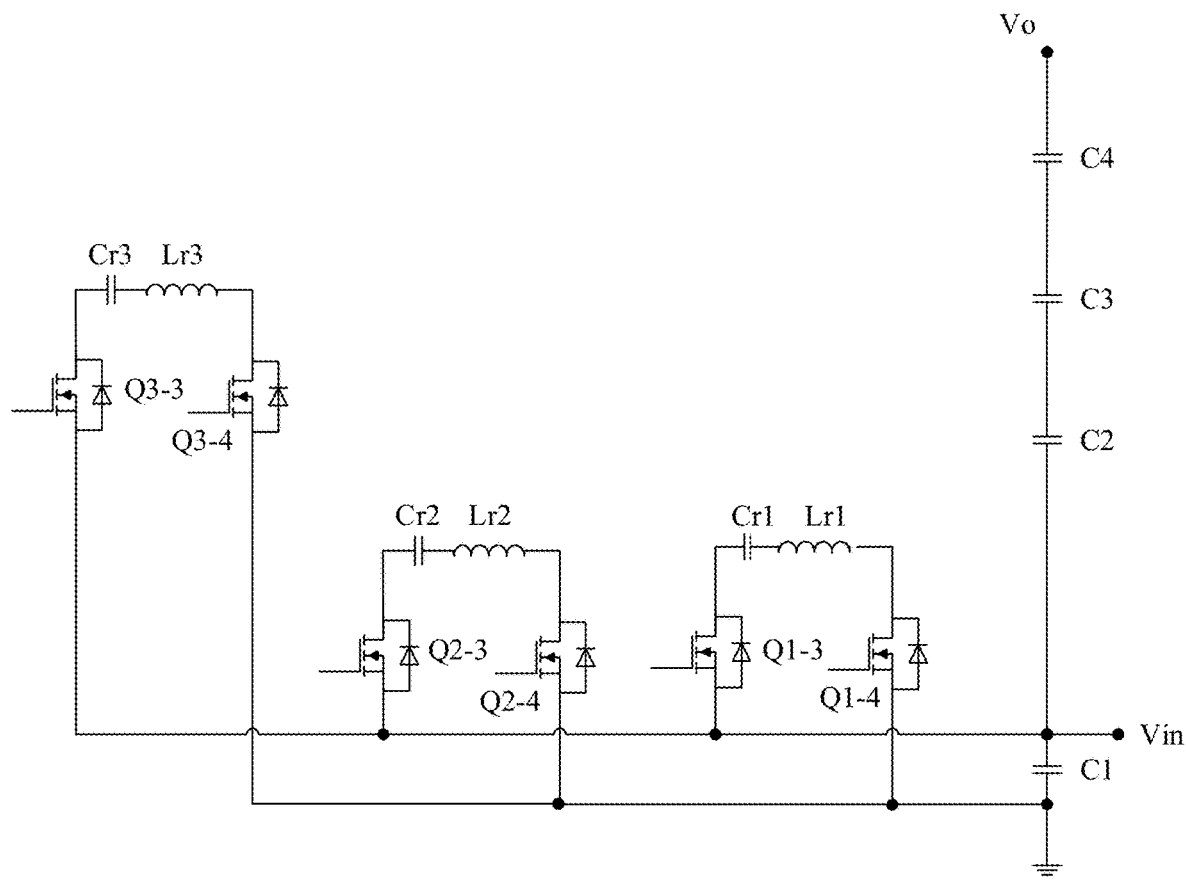
FIG. 32 is an equivalent diagram in a first period in a fourteenth embodiment of a converter circuit according to an embodiment of this application.
Figure 33:
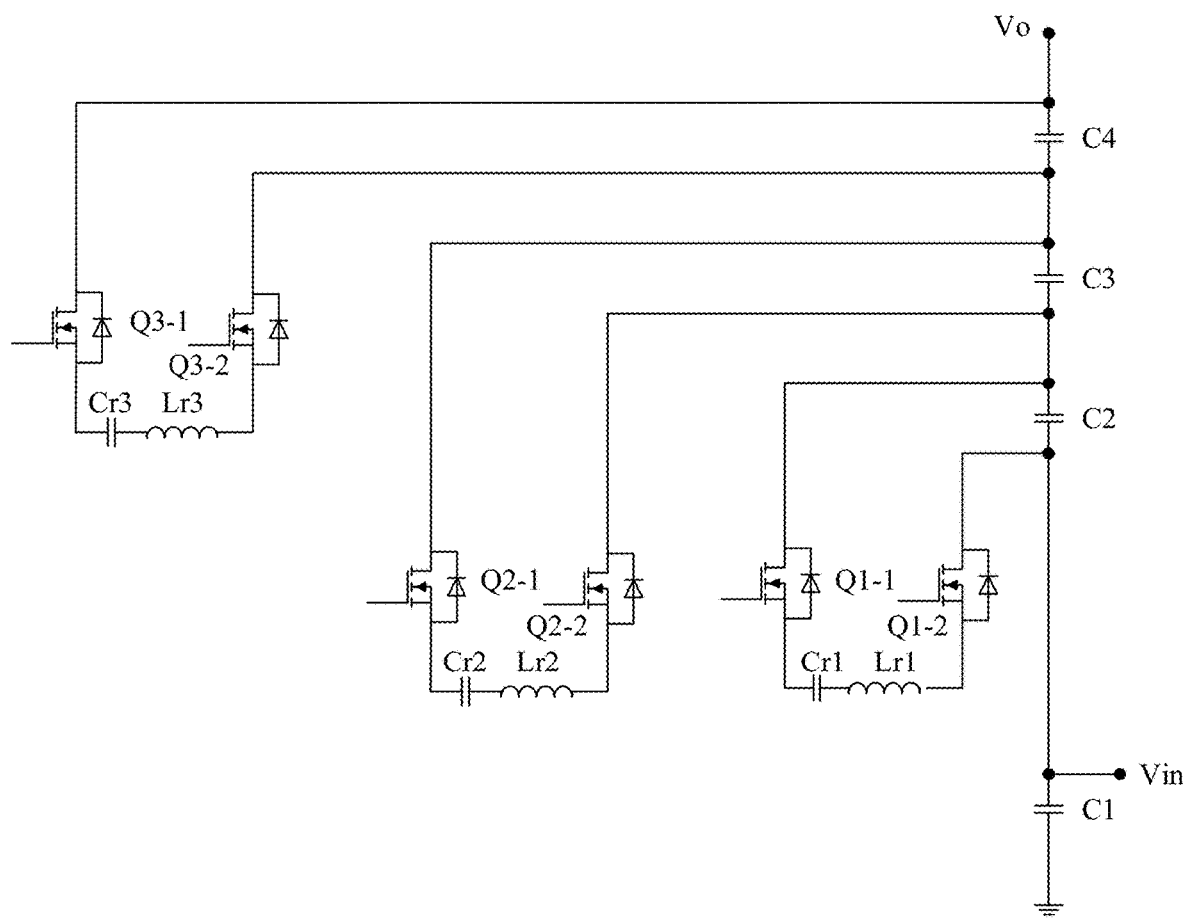
FIG. 33 is an equivalent diagram in a second period in a fourteenth embodiment of a converter circuit according to an embodiment of this application.

3. The Ratio of the Input Voltage to the Output Voltage is 1:4:

FIG. 31 is a schematic diagram of a fourteenth embodiment of the converter circuit provided in the embodiments of this application. This embodiment of this application provides the fourteenth embodiment of the converter circuit. Components and component connection relationships in this embodiment are similar to those corresponding to FIG. 20. Details are not described herein again. A difference lies in that Vin and Vo are exchanged (as shown in FIG. 31). In the following, only a boost converter circuit corresponding to the buck converter circuit shown in FIG. 20 is described as an example, and the boost converter circuits corresponding to FIG. 23 and FIG. 26 are not described herein again.

The following uses in-phase driving of switches as an example for detailed descriptions of an operating principle in this embodiment:

3.1. First Period:

FIG. 28 may be equivalent to FIG. 29. When the third switch Q1-3, the fourth switch Q1-4, the seventh switch Q2-3, the eighth switch Q2-4, the eleventh switch Q3-3, and the twelfth switch Q3-4 are turned off (a high level is input), and the first switch Q1-1, the second switch Q1-2, the fifth switch Q2-1, the sixth switch Q2-2, the ninth switch Q3-1, and the tenth switch Q3-2 are turned off (a low level is input), the first resonant capacitor Cr1, the second resonant capacitor Cr2, and the third resonant capacitor Cr3 are charged by the first capacitor C1.

3.2. Second Period:

FIG. 28 may be equivalent to FIG. 30. When the first switch Q1-1, the second switch Q1-2, the fifth switch Q2-1, the sixth switch Q2-2, the ninth switch Q3-1, and the tenth switch Q3-2 are turned on (a high level is input), and the third switch Q1-3, the fourth switch Q1-4, the seventh switch Q2-3, the eighth switch Q2-4, the eleventh switch Q3-3, and the twelfth switch Q3-4 are turned off (a low level is input), the second capacitor C2 is charged by the first resonant capacitor Cr1, the third capacitor C3 is charged by the second resonant capacitor Cr2, and the fourth capacitor C4 is charged by the third resonant capacitor Cr3. In this case, the first capacitor C1 is an input capacitor. Because the voltage between the two ends of the first resonant capacitor Cr1 is equal to the voltage between the two ends of the first capacitor C1 and the second capacitor C2 is charged by the first resonant capacitor Cr1, the voltage between the two ends of the second capacitor C2 is equal to the voltage between the two ends of the first capacitor C1. Similarly, the voltage between the two ends of the third capacitor C3 and the voltage between the two ends of the fourth capacitor C4 are equal to the voltage between the two ends of the first capacitor C1. That is, the voltage between the two ends of the first capacitor C1, the voltage between the two ends of the second capacitor C2, the voltage between the two ends of the third capacitor C3, and the voltage between the two ends of the fourth capacitor C4 are equal. Therefore, a voltage from the two ends of the first capacitor C1 to the two ends of the fourth capacitor C4 is four times as much as the voltage between the two ends of the first capacitor C1, so that the output voltage Vo is four times as much as the input voltage Vin, that is, a voltage gain is 4:1 (Vin:Vo=4:1).

In this embodiment of this application, the voltage between the two ends of the first capacitor C1 is equal to a voltage between two ends of another capacitor through energy transfer between the first capacitor C1 and each resonant circuit, energy transfer between each resonant circuit and another capacitor, and a duty ratio of approximately 50% for each switch, so that a balanced voltage gain is obtained. Then, Vin and Vo are exchanged to implement a boosting principle and a step-down principle.

In addition to the foregoing forms of the converter circuit in the embodiments of this application, a quantity of components may be increased or other forms may be used to implement the effects achieved in the embodiments of this application. This is not limited herein.

The second switch, the fourth switch, the sixth switch, the eighth switch, the tenth switch and the twelfth switch in the embodiments of this application may be diodes, and the first switch, the third switch, the fifth switch, the seventh switch, the ninth switch and the eleventh switch may be NMOSs or IGBTs.

Figure 34:
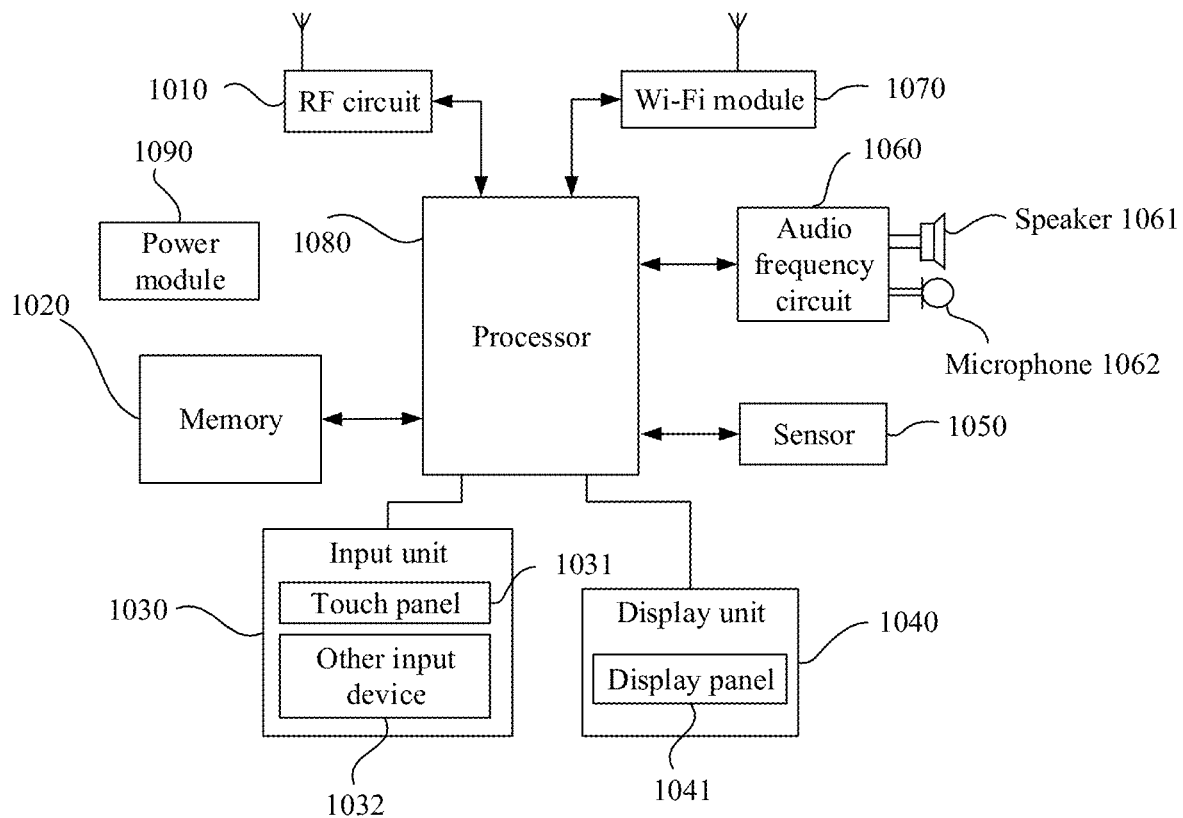
FIG. 34 is a schematic diagram of a structure of an electronic device in which a power module is located according to an embodiment of this application.

The converter circuits in the embodiments of this application may be used in various electronic devices, and the power module shown in FIG. 1 may be used in an electronic device shown in FIG. 34.

As shown in FIG. 34, the electronic device may be any electronic device, that includes the power module, for example, a mobile phone, a tablet computer, a personal digital assistant (PDA), a point of sales (POS), or a vehicle-mounted computer.

FIG. 34 is a block diagram of a partial structure of a mobile phone related to the electronic device provided in this embodiment of this application. With reference to FIG. 34, the mobile phone includes components such as a radio frequency (RF) circuit 1010, a memory 1020, an input unit 1030, a display unit 1040, a sensor 1050, an audio frequency circuit 1060, a wireless fidelity (Wi-Fi) module 1070, a processor 1080, and a power module 1090. A person skilled in the art may understand that the structure of the mobile phone shown in FIG. 34 does not constitute a limitation on the mobile phone, and the mobile phone may include more or fewer components than those shown in the figure, or some components are combined, or a different component arrangement may be used.

The following describes each component of the mobile phone in detail with reference to FIG. 34.

The RF circuit 1010 may be configured to receive and send a signal in an information receiving and sending process or a call process. In particular, the RF circuit 1010 receives downlink information from a base station, and then sends the downlink information to the processor 1080 for processing. In addition, the RF circuit 1010 sends designed uplink data to the base station. Usually, the RF circuit 1010 includes but is not limited to an antenna, at least one amplifier, a transceiver, a coupler, a low noise amplifier (LNA), a duplexer, and the like. In addition, the RF circuit 1010 may further communicate with a network and another device through wireless communication. Any communication standard or protocol may be used for the wireless communication, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

The memory 1020 may be configured to store a software program and a module. The processor 1080 performs various function applications of the mobile phone and data processing by running the software program and the module that are stored in the memory 1020. The memory 1020 may include a program storage area and a data storage area. The program storage area may store an operating system, an application program required by at least one function (for example, a sound play function and an image play function), and the like. The data storage area may store data (for example, audio data and an address book) created based on use of the mobile phone, and the like. In addition, the memory 1020 may include a high speed random access memory, and may further include a nonvolatile memory, for example, at least one magnetic disk storage device, a flash memory device, or another volatile solid-state storage device.

The input unit 1030 may be configured to: receive entered number or character information, and generate a key signal input related to a user setting and function control of the mobile phone. Specifically, the input unit 1030 may include a touch panel 1031 and another input device 1032. The touch panel 1031, also referred to as a touchscreen, may collect a touch operation performed by the user on or near the touch panel 1031 (for example, an operation performed by a user on or near the touch panel 1031 by using any proper object or accessory such as a finger or a stylus), and drive a corresponding connection apparatus based on a preset program. Optionally, the touch panel 1031 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 1080, and can receive and execute a command sent by the processor 1080. In addition, the touch panel 1031 may be implemented in a plurality of types, such as a resistive type, a capacitive type, an infrared type, and a surface acoustic wave type. The input unit 1030 may include the another input device 1032 in addition to the touch panel 1031. Specifically, the another input device 1032 may include but is not limited to one or more of a physical key board, a function key (for example, a volume control key or an on/off key), a trackball, a mouse, a joystick, and the like.

The display unit 1040 may be configured to display information entered by the user or information provided for the user, and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 may cover the display panel 1041. After detecting the touch operation on or near the touch panel 1031, the touch panel 1031 transmits the touch operation to the processor 1080 to determine a type of a touch event, and then the processor 1080 provides corresponding visual output on the display panel 1041 based on the type of the touch event. In FIG. 34, the touch panel 1031 and the display panel 1041 are used as two independent components to implement input and output functions of the mobile phone. However, in some embodiments, the touch panel 1031 and the display panel 1041 may be integrated to implement the input and output functions of the mobile phone.

The mobile phone may further include at least one sensor 1050, for example, a light sensor, a motion sensor, and another sensor. Specifically, the light sensor may include an ambient light sensor and a proximity sensor. The ambient light sensor may adjust luminance of the display panel 1041 based on brightness of ambient light. The proximity sensor may turn off the display panel 1041 and/or backlight when the mobile phone approaches to an ear. As a type of the motion sensor, an acceleration sensor may detect a value of an acceleration in each direction (generally, three axes), may detect a value and a direction of gravity in a static state, and may be used in an application for identifying a posture (such as screen switching between landscape and portrait modes, a related game, or magnetometer posture calibration) of the mobile phone, a function related to vibration identification (such as a pedometer or a knock), and the like. Another sensor such as a gyroscope, a barometer, a hygrometer, a thermometer, or an infrared sensor may further be disposed on the mobile phone.

The audio circuit 1060, a speaker 1061, and a microphone 1062 may provide an audio interface between the user and the mobile phone. The audio circuit 1060 may convert received audio data into an electrical signal, and transmit the electrical signal to the speaker 1061, and the speaker 1061 converts the electrical signal into a sound signal for output. In addition, the microphone 1062 converts a collected sound signal into an electrical signal. The audio circuit 1060 receives the electrical signal, converts the electrical signal into audio data, and then outputs the audio data to the processor 1080 for processing. The processor 1080 sends the audio data to, for example, another mobile phone by using the RF circuit 1010, or outputs the audio data to the memory 1020 for further processing.

Wi-Fi is a short-distance wireless transmission technology. The mobile phone may include Wi-Fi module 1070. With the Wi-Fi module 1070, the mobile phone may help the user send and receive an email, browse a web page, access streaming media, and the like. The Wi-Fi module 1070 provides wireless access to the broadband internet for the user.

The processor 1080 is a control center of the mobile phone, connects each part of the entire mobile phone through various interfaces and lines, and performs various functions of the mobile phone and data processing by running or executing the software program and/or the module that are/is stored in the memory 1020 and invoking data stored in the memory 1020, to perform overall monitoring on the mobile phone. Optionally, the processor 1080 may include one or more processing units. Preferably, an application processor and a modem processor may be integrated into the processor 1080. The application processor processes an operating system, a user interface, an application program, and the like. The modem processor processes wireless communication. It may be understood that the modem processor may alternatively not be integrated into the processor 1080.

The mobile phone further includes the power supply 1090 (for example, a battery) supplying power to the components. Preferably, the power supply may be logically connected to the processor 1080 by using a power management system, to implement functions such as management of charging, discharging, and power consumption by using the power management system.

The mobile phone may further include a camera, a Bluetooth module, and the like.

The converter circuit provided in embodiments of this application is described in detail above. The principle and implementation of this application are described herein through specific examples in the specification. The description about embodiments of this application is merely provided to help understand principles of this application. It will be appreciated that a person of ordinary skill in the art can make variations and modifications to this application in terms of the specific implementations and application scopes according to the principles of this application. Therefore, the content of specification should not be construed in an unduly limiting manner.

What is claimed is:

1. A converter circuit, comprising:
   a capacitor group, wherein the capacitor group comprises a first capacitor and a second capacitor; and
   a balance circuit, wherein the balance circuit comprises a first resonant circuit;
   wherein the first resonant circuit comprises two switch groups connected in parallel and a first resonant tank bridged between the two switch groups;
   wherein the first capacitor and the second capacitor are connected in series;
   wherein the first resonant circuit is separately bridged between two ends of the first capacitor and between two ends of the second capacitor;
   wherein the balance circuit is configured to control each switch in the first resonant circuit such that each switch works with the first resonant tank to affect a current to balance a voltage between the two ends of the first capacitor and a voltage between the two ends of the second capacitor;
   wherein one of the two switch groups in the first resonant circuit comprises a first switch and a third switch, the other of the two switch groups in the first resonant circuit comprises a second switch and a fourth switch, and the first resonant tank comprises a first resonant capacitor and a first resonant inductor;
   wherein the first switch and the third switch are connected in series, the second switch and the fourth switch are connected in series, one end of the second capacitor is connected to a first end of the first switch, the other end of the second capacitor is separately connected to a first end of the second switch, a second end of the third switch, and one end of the first capacitor, and the other end of the first capacitor is connected to a second end of the fourth switch;
   wherein one end of the first resonant tank is separately connected to a second end of the first switch and a first end of the third switch, and the other end of the first resonant tank is separately connected to a second end of the second switch and a first end of the fourth switch; and
   wherein the first switch and the third switch are not simultaneously turned on, and the second switch and the fourth switch are not simultaneously turned on.

2. The converter circuit according to claim 1, wherein the capacitor group further comprises a third capacitor:
   wherein the balance circuit further comprises a second resonant circuit, wherein the second resonant circuit comprises two switch groups connected in parallel and a second resonant tank bridged between the two switch groups;
   wherein one of the two switch groups in the second resonant circuit comprises a fifth switch and a seventh switch, the other of the two switch groups in the second resonant circuit comprises a sixth switch and an eighth switch, and the second resonant tank comprises a second resonant capacitor and a second resonant inductor;
   wherein the second resonant circuit is separately bridged between the two ends of the first capacitor and between two ends of the third capacitor;
   wherein the balance circuit is configured to control each switch in the second resonant circuit such that each switch works with the second resonant tank to affect a current to balance the voltage between the two ends of the first capacitor and a voltage between the two ends of the third capacitor; and
   wherein the fifth switch and the seventh switch are not simultaneously turned on, and the sixth switch and the eighth switch are not simultaneously turned on.

3. The converter circuit according to claim 1, wherein the balance circuit further comprises a second resonant circuit, wherein the second resonant circuit comprises two switch groups connected in parallel and a second resonant tank bridged between the two switch groups:
   wherein one of the two switch groups in the second resonant circuit comprises a fifth switch and a seventh switch, the other of the two switch groups in the second resonant circuit comprises a sixth switch and an eighth switch, and the second resonant tank comprises a second resonant capacitor and a second resonant inductor;
   wherein the balance circuit is configured to control each switch in the second resonant circuit such that each switch works with the second resonant tank to affect a current to balance the voltage between the two ends of the first capacitor and a voltage between two ends of the second resonant capacitor; and
   wherein the fifth switch and the seventh switch are not simultaneously turned on, and the sixth switch and the eighth switch are not simultaneously turned on.

4. The converter circuit according to claim 2, wherein the first resonant capacitor and the first resonant inductor are connected in series, and the second resonant capacitor and the second resonant inductor are connected in series:
   wherein the first capacitor, the second capacitor, and the third capacitor are sequentially connected in series;
   wherein one end of the third capacitor is connected to a first end of the fifth switch, the other end of the third capacitor is separately connected to a first end of the sixth switch, the first end of the first switch, and one end of the second capacitor, the other end of the second capacitor is separately connected to the first end of the second switch, one end of the first capacitor, the second end of the third switch, and a second end of the seventh switch, and the other end of the first capacitor is separately connected to the second end of the fourth switch and a second end of the eighth switch;
   wherein the first switch and the third switch are connected in series, the second switch and the fourth switch are connected in series, one end of the first resonant tank is separately connected to the second end of the first switch and the first end of the third switch, and the other end of the first resonant tank is separately connected to the second end of the second switch and the first end of the fourth switch; and
   wherein the fifth switch and the seventh switch are connected in series, the sixth switch and the eighth switch are connected in series, one end of the second resonant tank is separately connected to a second end of the fifth switch and a first end of the seventh switch, and the other end of the second resonant tank is separately connected to a second end of the sixth switch and a first end of the eighth switch.

5. The converter circuit according to claim 3, wherein the capacitor group further comprises a third capacitor, the first resonant capacitor and the first resonant inductor are connected in series, and the second resonant capacitor and the second resonant inductor are connected in series:
  wherein a first end of the fifth switch is connected to one end of the third capacitor, the sixth switch is separately connected to one end of the second capacitor and the first end of the first switch, the other end of the second capacitor is separately connected to the first end of the second switch, one end of the first capacitor, the second end of the third switch, and a second end of the sixth switch, and the other end of the first capacitor is separately connected to the other end of the third capacitor, the second end of the fourth switch, and a second end of the eighth switch;
  wherein the first switch and the third switch are connected in series, the second switch and the fourth switch are connected in series, one end of the first resonant tank is separately connected to the second end of the first switch and the first end of the third switch, and the other end of the first resonant tank is separately connected to the second end of the second switch and the first end of the fourth switch; and
  wherein the fifth switch and the seventh switch are connected in series, the sixth switch and the eighth switch are connected in series, one end of the second resonant tank is separately connected to a second end of the fifth switch and a first end of the seventh switch, and the other end of the second resonant tank is separately connected to a second end of the sixth switch and a first end of the eighth switch.

6. The converter circuit according to claim 3, wherein the converter circuit further comprises a direct current power supply, the first resonant capacitor and the first resonant inductor are connected in series, and the second resonant capacitor and the second resonant inductor are connected in series:
  wherein a first end of the fifth switch is connected to one end of the direct current power supply, the sixth switch is separately connected to one end of the second capacitor and the first end of the first switch, the other end of the second capacitor is separately connected to the first end of the second switch, one end of the first capacitor, the second end of the third switch, and a second end of the sixth switch, and the other end of the first capacitor is separately connected to the other end of the direct current power supply, the second end of the fourth switch, and a second end of the eighth switch;
  wherein the first switch and the third switch are connected in series, the second switch and the fourth switch are connected in series, one end of the first resonant tank is separately connected to the second end of the first switch and the first end of the third switch, and the other end of the first resonant tank is separately connected to the second end of the second switch and the first end of the fourth switch; and
  wherein the fifth switch and the seventh switch are connected in series, the sixth switch and the eighth switch are connected in series, one end of the second resonant tank is separately connected to a second end of the fifth switch and a first end of the seventh switch, and the other end of the second resonant tank is separately connected to a second end of the sixth switch and a first end of the eighth switch.

7. The converter circuit according to claim 4, wherein the capacitor group further comprises a fourth capacitor:
  wherein the balance circuit further comprises a third resonant circuit, wherein the third resonant circuit comprises two switch groups connected in parallel and a third resonant tank bridged between the two switch groups;
  wherein one of the two switch groups in the third resonant circuit comprises a ninth switch and an eleventh switch, the other one of the two switch groups in the third resonant circuit comprises a tenth switch and a twelfth switch, and the third resonant circuit comprises a third resonant capacitor and a third resonant inductor;
  wherein the third resonant circuit is separately bridged between the two ends of the first capacitor and between two ends of the fourth capacitor;
  wherein the balance circuit is configured to control each switch in the third resonant circuit such that each switch works with the third resonant tank to affect a current to balance the voltage between the two ends of the first capacitor and a voltage between the two ends of the fourth capacitor; and
  wherein the ninth switch and the eleventh switch are not simultaneously turned on, and the tenth switch and the twelfth switch are not simultaneously turned on.

8. The converter circuit according to claim 4, wherein the balance circuit further comprises a third resonant circuit, wherein the third resonant circuit comprises two switch groups connected in parallel and a third resonant tank bridged between the two switch groups:
  wherein one of the two switch groups in the third resonant circuit comprises a ninth switch and an eleventh switch, the other one of the two switch groups in the third resonant circuit comprises a tenth switch and a twelfth switch, and the third resonant circuit comprises a third resonant capacitor and a third resonant inductor;
  wherein the balance circuit is configured to control each switch in the third resonant circuit such that each switch works with the third resonant tank to affect a current to balance the voltage between the two ends of the first capacitor and a voltage between two ends of the third resonant capacitor; and
  wherein the ninth switch and the eleventh switch are not simultaneously turned on, and the tenth switch and the twelfth switch are not simultaneously turned on.

9. The converter circuit according to claim 7, wherein the third resonant capacitor and the third resonant inductor are connected in series, and the first capacitor, the second capacitor, the third capacitor, and the fourth capacitor are sequentially connected in series:
  wherein one end of the fourth capacitor is connected to a first end of the ninth switch, the other end of the fourth capacitor is separately connected to a first end of the tenth switch, the first end of the fifth switch, and one end of the third capacitor, one end of the third capacitor is connected to the first end of the fifth switch, the other end of the third capacitor is separately connected to the first end of the sixth switch, the first end of the first switch, and one end of the second capacitor, the other end of the second capacitor is separately connected to the first end of the second switch, one end of the first capacitor, the second end of the third switch, the second end of the seventh switch, and a second end of the eleventh switch, and the other end of the first capacitor is separately connected to the second end of the fourth switch, the second end of the eighth switch, and a second end of the twelfth switch; and wherein the ninth switch and the eleventh switch are connected in series, the tenth switch and the twelfth switch are connected in series, one end of the third resonant tank is separately connected to a second end of the ninth switch and a first end of the eleventh switch, and the other end of the third resonant tank is separately connected to a second end of the tenth switch and a first end of the twelfth switch.

10. The converter circuit according to claim 8, wherein the capacitor group further comprises a fourth capacitor, and the third resonant capacitor and the third resonant inductor are connected in series:

wherein a first end of the ninth switch is connected to one end of the fourth capacitor, the tenth switch is separately connected to the first end of the fifth switch and one end of the third capacitor, and the other end of the third capacitor is separately connected to the first end of the sixth switch, the first end of the first switch, and one end of the second capacitor;

wherein the other end of the second capacitor is separately connected to the first end of the second switch, one end of the first capacitor, the second end of the third switch, and the second end of the sixth switch, and the other end of the first capacitor is separately connected to the other end of the fourth capacitor, the second end of the fourth switch, and the second end of the eighth switch; and wherein the ninth switch and the eleventh switch are connected in series, the tenth switch and the twelfth switch are connected in series, one end of the third resonant tank is separately connected to a second end of the ninth switch and a first end of the eleventh switch, and the other end of the third resonant tank is separately connected to a second end of the tenth switch and a first end of the twelfth switch.

11. The converter circuit according to claim 8, wherein the converter circuit further comprises a direct current power supply, and the third resonant capacitor and the third resonant inductor are connected in series:

wherein a first end of the ninth switch is connected to one end of the direct current power supply, the tenth switch is separately connected to the first end of the fifth switch and one end of the third capacitor, and the other end of the third capacitor is separately connected to the first end of the sixth switch, the first end of the first switch, and one end of the second capacitor;

wherein the other end of the second capacitor is separately connected to the first end of the second switch, one end of the first capacitor, the second end of the third switch, and the second end of the sixth switch, and the other end of the first capacitor is separately connected to the other end of the direct current power supply, the second end of the fourth switch, and the second end of the eighth switch; and wherein the ninth switch and the eleventh switch are connected in series, the tenth switch and the twelfth switch are connected in series, one end of the third resonant tank is separately connected to a second end of the ninth switch and a first end of the eleventh switch, and the other end of the third resonant tank is separately connected to a second end of the tenth switch and a first end of the twelfth switch.

12. The converter circuit according to claim 1, wherein the voltage between the two ends of the first capacitor is an output voltage, and a voltage between two ends of the capacitor group is an input voltage.

13. The converter circuit according to claim 1, wherein the voltage between the two ends of the first capacitor is an input voltage, and a voltage between two ends of the capacitor group is an output voltage.

14. The converter circuit according to claim 1, wherein a switch of the two switch groups of the first resonant circuit comprises an insulated gate bipolar transistor (IGBT).

15. The converter circuit according to claim 1, wherein a switch of the two switch groups of the first resonant circuit comprises an N-channel metal oxide semiconductor (NMOS).

16. The converter circuit according to claim 1, wherein the first switch and the third switch are N-channel metal oxide semiconductors (NMOSs), and the second switch and the fourth switch are diodes.

17. The converter circuit according to claim 2, wherein the first switch, the third switch, the fifth switch, and the seventh switch are N-channel metal oxide semiconductors (NMOSs), and the second switch, the fourth switch, the sixth switch, and the eighth switch are diodes.

18. An electronic device, comprising:

a converter circuit, wherein the converter circuit comprises a capacitor group and a balance circuit, wherein the capacitor group comprises a first capacitor and a second capacitor, and the balance circuit comprises a first resonant circuit;

wherein the first resonant circuit comprises two switch groups connected in parallel and a first resonant tank bridged between the two switch groups;

wherein the first capacitor and the second capacitor are connected in series;

wherein the first resonant circuit is separately bridged between two ends of the first capacitor and between two ends of the second capacitor; and wherein the balance circuit is configured to control each switch in the first resonant circuit such that each switch works with the first resonant tank to affect a current to balance a voltage between the two ends of the first capacitor and a voltage between the two ends of the second capacitor;

wherein one of the two switch groups in the first resonant circuit comprises a first switch and a third switch, the other of the two switch groups in the first resonant circuit comprises a second switch and a fourth switch, and the first resonant tank comprises a first resonant capacitor and a first resonant inductor;

wherein the first switch and the third switch are connected in series, the second switch and the fourth switch are connected in series, one end of the second capacitor is connected to a first end of the first switch, the other end of the second capacitor is separately connected to a first end of the second switch, a second end of the third switch, and one end of the first capacitor, and the other end of the first capacitor is connected to a second end of the fourth switch;

wherein one end of the first resonant tank is separately connected to a second end of the first switch and a first end of the third switch, and the other end of the first resonant tank is separately connected to a second end of the second switch and a first end of the fourth switch; and wherein the first switch and the third switch are not simultaneously turned on, and the second switch and the fourth switch are not simultaneously turned on.

19. A converter circuit, comprising:
- a capacitor group, wherein the capacitor group comprises a first capacitor and a second capacitor; and
- a balance circuit, wherein the balance circuit comprises a first resonant circuit;
- wherein the first resonant circuit comprises two switch groups connected in parallel and a first resonant tank bridged between the two switch groups;
- wherein the first capacitor and the second capacitor are connected in series;
- wherein the first resonant circuit is separately bridged between two ends of the first capacitor and between two ends of the second capacitor;
- wherein the balance circuit is configured to control each switch in the first resonant circuit such that each switch works with the first resonant tank to affect a current to balance a voltage between the two ends of the first capacitor and a voltage between the two ends of the second capacitor;
- wherein the voltage between the two ends of the first capacitor is an input voltage, and a voltage between two ends of the capacitor group is an output voltage.

\* \* \* \* \*

UNITED STATES PATENT AND TRADEMARK OFFICE
CERTIFICATE OF CORRECTION

| | |
|---|---|
| PATENT NO. | : 12,107,496 B2 |
| APPLICATION NO. | : 17/848155 |
| DATED | : October 1, 2024 |
| INVENTOR(S) | : Chen et al. |

It is certified that error appears in the above-identified patent and that said Letters Patent is hereby corrected as shown below:

In the Claims

Claim 2: Column 31, Line 60: "capacitor group further comprises a third capacitor:" should read as -- capacitor group further comprises a third capacitor; --.

Claim 3: Column 32, Line 22: "bridged between the two switch groups:" should read as -- bridged between the two switch groups; --.

Claim 4: Column 32, Line 42: "the second resonant inductor are connected in series:" should read as -- the second resonant inductor are connected in series; --.

Claim 5: Column 33, Line 9: "second resonant inductor are connected in series:" should read as -- second resonant inductor are connected in series; --.

Claim 6: Column 33, Line 42: "series:" should read as -- series; --.

Claim 7: Column 34, Line 5: "capacitor group further comprises a fourth capacitor:" should read as -- capacitor group further comprises a fourth capacitor; --.

Claim 8: Column 34, Line 33: "bridged between the two switch groups:" should read as -- bridged between the two switch groups; --.

Claim 9: Column 34, Line 53: "sequentially connected in series:" should read as -- sequentially connected in series; --.

Claim 10: Column 35, Line 15: "are connected in series:" should read as -- are connected in series; --.

Claim 11: Column 35, Line 42: "nant inductor are connected in series:" should read as -- nant inductor are connected in series; --.

Signed and Sealed this
Twentieth Day of May, 2025

Coke Morgan Stewart
*Acting Director of the United States Patent and Trademark Office*